(12) United States Patent
Dellinger et al.

(10) Patent No.: US 12,245,557 B2
(45) Date of Patent: Mar. 11, 2025

(54) FLORAL ARRANGING DEVICE

(71) Applicant: Floracraft Corporation, Ludington, MI (US)

(72) Inventors: Lindsey Dellinger, Grand Rapids, MI (US); Dondi Richardson, Ludington, MI (US); Amy Steidl Olson, Ludington, MI (US); Eric Erwin, Ludington, MI (US); Brett Kincaid, Grand Rapids, MI (US); Daniel Tagtow, Ludington, MI (US)

(73) Assignee: Floracraft Corporation, Ludington, MI (US)

( * ) Notice: Subject to any disclaimer, the term of this patent is extended or adjusted under 35 U.S.C. 154(b) by 0 days.

(21) Appl. No.: 18/381,487

(22) Filed: Oct. 18, 2023

(65) Prior Publication Data

US 2024/0040969 A1 Feb. 8, 2024

Related U.S. Application Data

(63) Continuation of application No. 17/889,581, filed on Aug. 17, 2022.

(60) Provisional application No. 63/234,734, filed on Aug. 19, 2021.

(51) Int. Cl.
*A47G 7/06* (2006.01)
*A01G 5/04* (2006.01)
*E04H 13/00* (2006.01)

(52) U.S. Cl.
CPC ............. *A01G 5/04* (2013.01); *E04H 13/001* (2013.01)

(58) Field of Classification Search
CPC ... A47G 7/02; A47G 7/04; A47G 7/06; A01G 5/00; A01G 5/04; E04H 13/001
See application file for complete search history.

(56) References Cited

U.S. PATENT DOCUMENTS

| 1,448,808 A | 3/1923 | McGowan |
| 1,739,702 A | 12/1929 | Wing |
| 1,765,140 A | 6/1930 | Fitl |
| 1,874,185 A | 8/1932 | Goldstein |

(Continued)

FOREIGN PATENT DOCUMENTS

| DE | 9400351 U1 | 4/1994 |
| DE | 202009008128 U1 | 9/2009 |

(Continued)

OTHER PUBLICATIONS

European Search Report dated Dec. 22, 2022, received in corresponding European application No. 22020399.6.

(Continued)

*Primary Examiner* — Peter M Poon
*Assistant Examiner* — Danielle A Clerkley
(74) *Attorney, Agent, or Firm* — Harness, Dickey & Pierce, P.L.C.; Stephen T. Olson

(57) ABSTRACT

A two-part floral display assembly includes a vase proper and a mounting stand coupled to the vase proper. The floral display assembly further includes at least one male feature carried by one of the vase proper and the mounting stand and at least one female feature defined by the other of the vase proper and the mounting stand, the at least one female feature and the at least one male feature cooperatively arranged and configured to couple the vase proper and the mounting stand.

18 Claims, 28 Drawing Sheets

(56) References Cited

U.S. PATENT DOCUMENTS

| | | | |
|---|---|---|---|
| 1,876,322 A | 9/1932 | Rudolph | |
| 1,879,220 A * | 9/1932 | Harmony | A01G 9/02 248/156 |
| 1,973,102 A | 9/1934 | Reep | |
| 1,981,640 A * | 11/1934 | Baker | A47G 7/06 47/41.1 |
| 2,676,434 A | 4/1954 | Carlson | |
| 2,754,625 A * | 7/1956 | Walter, V | A47G 7/06 47/41.1 |
| D186,236 S | 9/1959 | O'Brien | |
| 3,328,914 A | 7/1967 | Newman | |
| 3,351,310 A | 11/1967 | Turner | |
| 3,434,235 A | 3/1969 | Gordon et al. | |
| D229,575 S | 12/1973 | Dallas | |
| 4,420,150 A | 12/1983 | Umezawa | |
| 4,522,366 A | 6/1985 | Howell, III | |
| 4,927,118 A | 5/1990 | Pierorazio | |
| 5,199,361 A | 4/1993 | Robinson | |
| 5,222,703 A | 6/1993 | Ricciardelli | |
| 6,149,119 A | 11/2000 | O'Connell | |
| 6,170,193 B1 * | 1/2001 | Wright | A01G 9/02 47/41.1 |
| D490,746 S | 6/2004 | Broel | |
| 8,088,460 B2 | 1/2012 | Looije et al. | |
| 11,638,493 B2 | 5/2023 | Haruna | |
| 2003/0126808 A1 | 7/2003 | Helwig | |
| 2014/0117031 A1 | 5/2014 | Zimmerman et al. | |
| 2017/0283143 A1 | 10/2017 | Nicks et al. | |
| 2018/0271306 A1 | 9/2018 | Kong | |
| 2019/0387688 A1 | 12/2019 | White | |
| 2021/0071439 A1 | 3/2021 | Currie | |
| 2023/0059626 A1 | 2/2023 | Dellinger et al. | |

FOREIGN PATENT DOCUMENTS

| | | |
|---|---|---|
| JP | S5331699 A | 3/1978 |
| JP | S5686072 A | 7/1981 |

OTHER PUBLICATIONS

Canadian Office Action regarding Patent Application No. 3170816, dated Oct. 24, 2023.

* cited by examiner

FLORAL ARRANGING DEVICE

CROSS-REFERENCE TO RELATED APPLICATION

This application is a continuation-in-part of and claims the benefit of U.S. Ser. No. 17/889,581, filed 17 Aug. 2022, which claims the benefit of U.S. Ser. No. 63/234,734 filed 19 Aug. 2021.

FIELD

The present disclosure generally relates to a floral display assembly. More particularly, the present disclosure relates to a two-part floral display assembly including a vase proper and a mounting stand coupled to the vase proper. In one embodiment, the floral display assembly is a cemetery vase.

BACKGROUND

This section provides background information related to the present disclosure which is not necessarily prior art.

Various types of floral display assemblies are known. While known floral display assemblies may generally serve their intended purposes, all are associated with disadvantages. As such, a need for continued improvement in the art remains.

SUMMARY

This section provides a general summary of the disclosure and is not a comprehensive disclosure of its full scope or all of its features.

It is a general object of the present teachings to provide a floral display assembly designed to withstand wind.

It is another general object of the present teachings to provide a floral display assembly that accommodates a wide variety of arrangements.

It is yet another general object of the present teachings to provide a floral display assembly in the form of a cemetery vase that is quick and easy to install.

It is still yet another general object of the present teachings to provide a floral display assembly vase that is more easily shipped.

In accordance with one particular aspect, the present teachings provide a two-part floral display assembly including a vase proper and a mounting stand coupled to the vase proper.

In accordance with another particular aspect, the present teachings provide a method of assembling a two-part floral display assembly. The method includes configuring the vase in a first orientation by inserting a lower end of the vase proper into the upper generally cylindrical portion of the mounting stand and rotating the vase proper relative to the mounting stand. The method may further include configuring the vase in a second, shipping orientation by nesting the vase proper at least partially within axially extending spikes of the mounting portion to effectively reduce a length of the vase.

In accordance with another particular aspect, the present teachings provide a two-part floral display assembly including a vase proper and a mounting stand. The mounting stand includes a connection portion adapted to interface with the vase proper. The connection portion has a generally cylindrical sidewall defining a female opening receiving a male portion defined at the bottom of the vase proper. The connection portion is closed at a lower end by a circular disk. The disk extends in a radial direction and is formed to include a plurality of holes axially extending there through for the drainage of water. The mounting stand includes a lower portion defined by a plurality of downwardly extending spikes. Upper ends of the spikes intersect the generally cylindrical sidewall of the connection portion. An inner side of each upper end may define an arcuate face abutting the vase proper and cooperating with the vase proper to center the vase proper within the opening. The connection portion further includes a plurality of detents that inwardly extend into the opening. The detents cooperate with a flange formed the bottom of the vase proper to maintain a connection between the mounting stand and the vase proper. The flange extends spirally around at least a portion of the vase proper. The vase proper is inserted into the female opening of the connection portion and rotated relative to the mounting stand to couple the vase proper and the mounting stand in a threaded manner. The vase proper and the mounting stand are both be formed of injection molded plastic.

In accordance with another particular aspect, the present teachings provide a two-part floral display assemblies that includes a vase proper and a mounting stand coupled to the vase proper. The floral display assembly further includes at least one male feature carried by one of the vase proper and the mounting stand and at least one female feature defined by the other of the vase proper and the mounting stand, the at least one female feature and the at least one male feature cooperatively arranged and configured to couple the vase proper and the mounting stand.

In accordance with another particular aspect, the present teachings provide a two-part floral display assembly including a vase proper having a generally cylindrical sidewall and a lower disk-shaped portion, and a mounting stand coupled to the vase proper. The mounting stand includes a generally cylindrical flange sized and configured to receive a lower portion of the generally cylindrical sidewall of the vase proper. The generally cylindrical flange is open at a top and a bottom thereof. The mounting stand includes a plurality of detents extending radially inward from the generally cylindrical flange. The vase proper includes a plurality of openings arranged and configured to receive the plurality of detents and cooperate with the plurality of detains to couple the vase proper and the mounting stand. Each opening of plurality of openings includes a first portion having a first radial dimension and a second portion having a second radial dimension, the first radial dimension being greater than the second radial dimension.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations are intended to limit the scope of the present disclosure.

DETAILED DESCRIPTION

Figure 1:
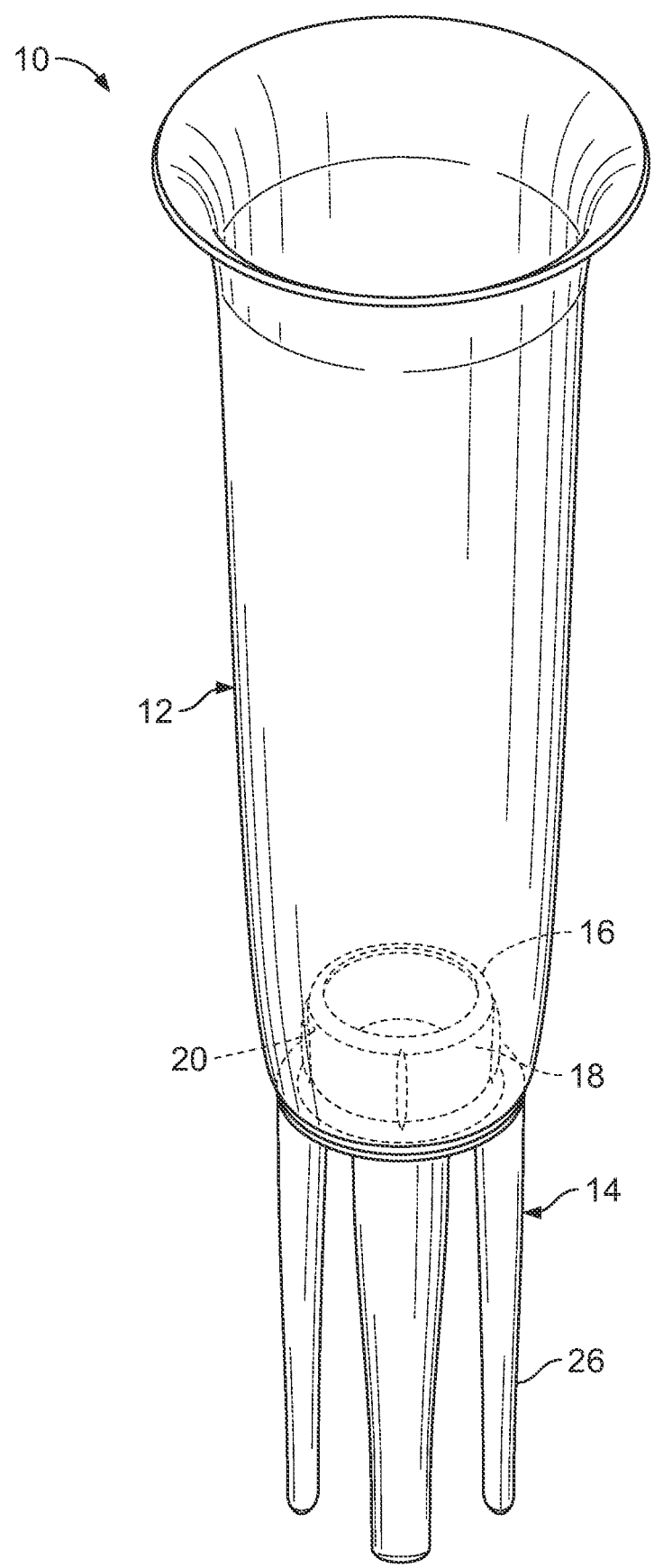
FIG. 1 is a perspective view of a floral display assembly constructed in accordance with the present teachings.
Figure 2:
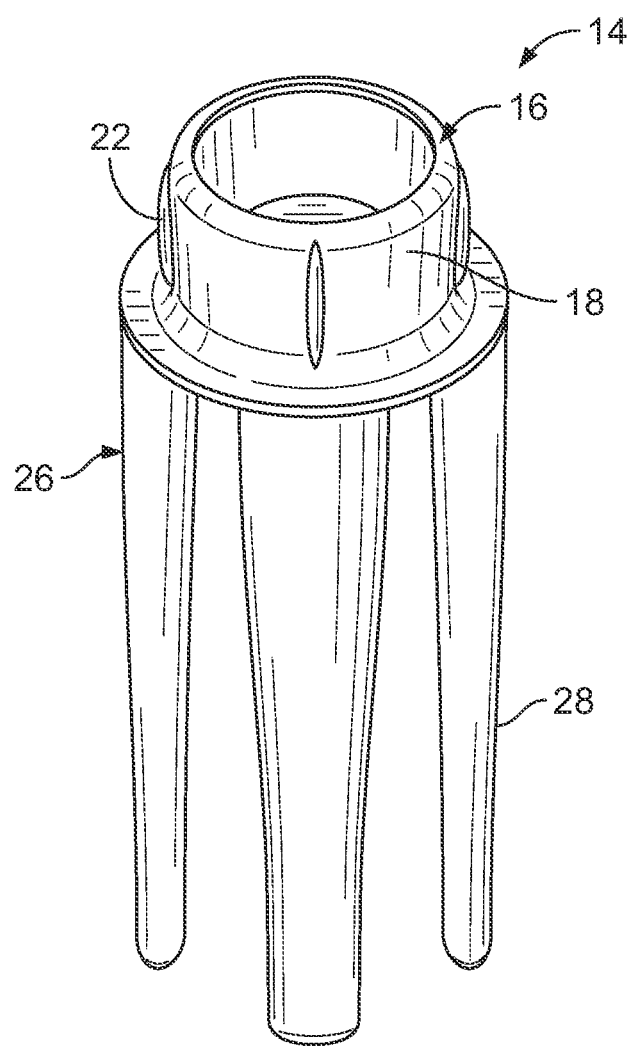
FIG. 2 is a mounting stand of the floral display assembly of FIG. 1.
Figure 3:
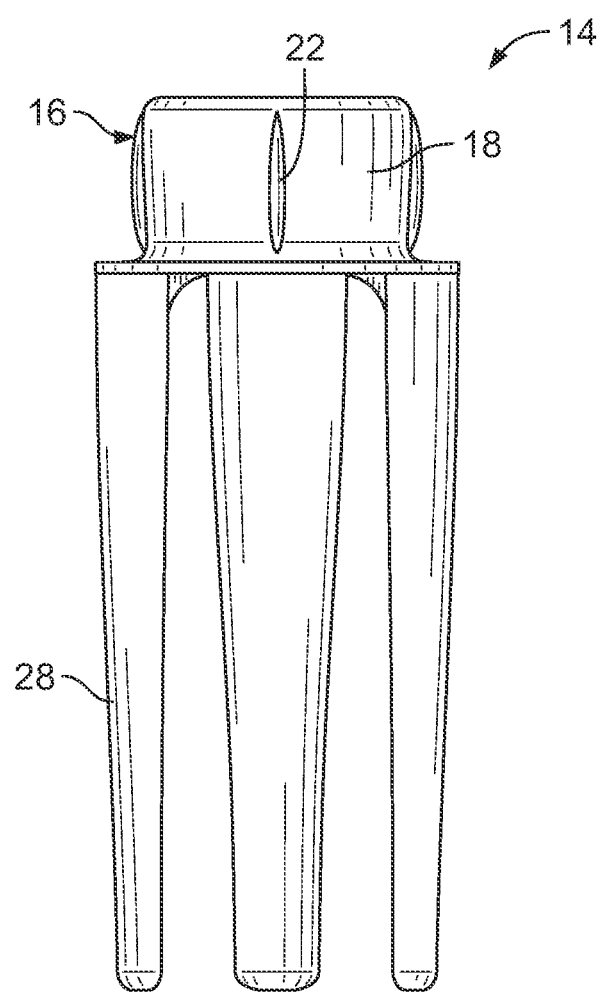
FIG. 3 is a side view of the mounting stand of FIG. 2.
Figure 4:
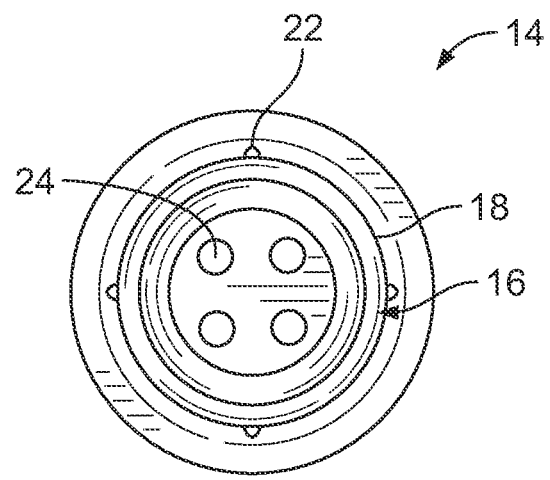
FIG. 4 is a top view of the mounting stand of FIG. 2.
Figure 5:
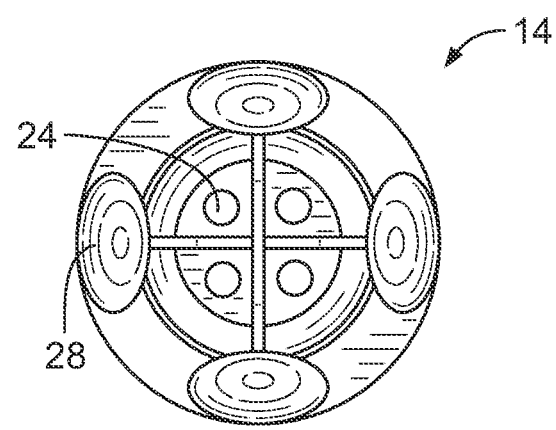
FIG. 5 is a bottom view of the mounting stand of FIG. 2.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

As used herein, the term "generally cylindrical" will be understood to include a geometry having a taper. In this regard, the term "generally cylindrical" shall not be strictly limited to a geometry with straight parallel sides and a circular cross-section. Explaining further, any element or portion of an element described herein as "generally cylindrical" may include a frusto-conical shape or partially include a frusto-conical shape.

With initial reference to FIGS. 1-5 a floral display assembly constructed in accordance with the teachings of the present invention is illustrated and generally identified at reference character 10. As illustrated, the floral display assembly may be a cemetery vase 10. The floral display assembly is shown to have a two-part construction including a vase proper 12 and mounting stand or base 14. The vase proper 12 and the mounting stand 14 may both be formed of injection molded plastic, for example. Alternatively, the vase proper 12 and the mounting stand 14 may be formed of any other suitable material within the scope of the present teachings. In FIGS. 2-5, the vase proper 12 has been removed for purposes of illustration. It will be understood the vase proper 12 may have a different configuration within the scope of the present teachings.

The mounting stand 14 includes a top portion or connection portion 16 adapted to interface with cooperating features of the vase proper 12. In this embodiment and the embodiment that follow, one of the vase proper 12 and the mounting stand 14 includes a female opening for receiving a male portion of the other of the vase proper 12 and the mounting stand 14. In the embodiment illustrated herein, the vase proper 12 includes the female opening and the mounting stand defines the male portion. It will be appreciated, however, that, alternatively, the vase proper 12 may define the male portion and the mounting stand 14 may include the female opening. Such an alternatively construction will be understood to be within the scope of the present teachings. As particularly illustrated in FIGS. 1-3, for example, the connection portion 16 has a generally cylindrical sidewall 18 defining a male element received within a corresponding female opening 20 in the bottom of the vase proper 12. The vase proper 12 and the mounting stand 14 may be press-fit together in an axial direction.

The generally cylindrical sidewall 18 may include a plurality of radially extending ribs 22 for securing a connection between the mounting stand 14 and the vase proper 12. A radially extending disk closes a lower end of the generally cylindrical portion 16. A plurality of holes 24 may axially extends through the connection portion 16 to facilitate the drainage of water.

The mounting stand is illustrated to include a lower portion 26 defined by a plurality of downwardly extending legs or spikes 28. In the embodiment illustrated, the lower portion 26 is defined by four spikes 28. The lower portion 26 may alternatively include a greater or lesser number of spikes 28 within the scope of the present teachings.

Turning to FIGS. 6-10, another floral display assembly constructed in accordance with the teachings of the present invention is illustrated and generally identified at reference character 100. Again, the floral display assembly may be a cemetery vase 100 having a two-part construction including a vase proper 112 and mounting stand or base 114. The vase proper 112 and the mounting stand 114 may both be formed of injection molded plastic or any other suitable material. In FIGS. 7-10, the vase proper 112 has been removed for purposes of illustration. It will be understood the vase proper 112 may have a different configuration within the scope of the present teachings.

The mounting stand 114 includes a top portion or connection portion 116 adapted to interface with cooperating features of the vase proper 112. As illustrated, the connection portion 116 has a generally cylindrical sidewall 118 defining a female opening 124 for receiving a corresponding male portion at a bottom 122 of the vase proper 112.

The connection portion 116 may be closed at a lower side by a circular disk 128. The circular disk 128 may formed with a plurality of holes 130 axially extending there through for the drainage of water.

The mounting stand 114 may include a lower portion 132 defined by a plurality of downwardly extending legs or spikes 134. In the embodiment illustrated, the lower portion 132 is defined by four spikes 134. The lower portion 132 may alternatively include a greater or lesser number of spikes 134 within the scope of the present teachings. Upper ends of the spikes 134 may intersect the generally cylindrical sidewall 118 of the connection portion 116 and on an inner side 138 of each upper end a detent 140. The detents 140 may extend radially inward and are adapted to cooperate with a flange 142 formed on or otherwise carried at the bottom of the vase proper 112 to maintain a connection between the mounting stand 114 and the vase proper 112. The flange 142 may extend spirally around at least a portion of the vase proper 112 and may cooperate in a thread-like manner with the detents 140 to couple the vase proper 112 and the mounting stand 114.

Figure 6:
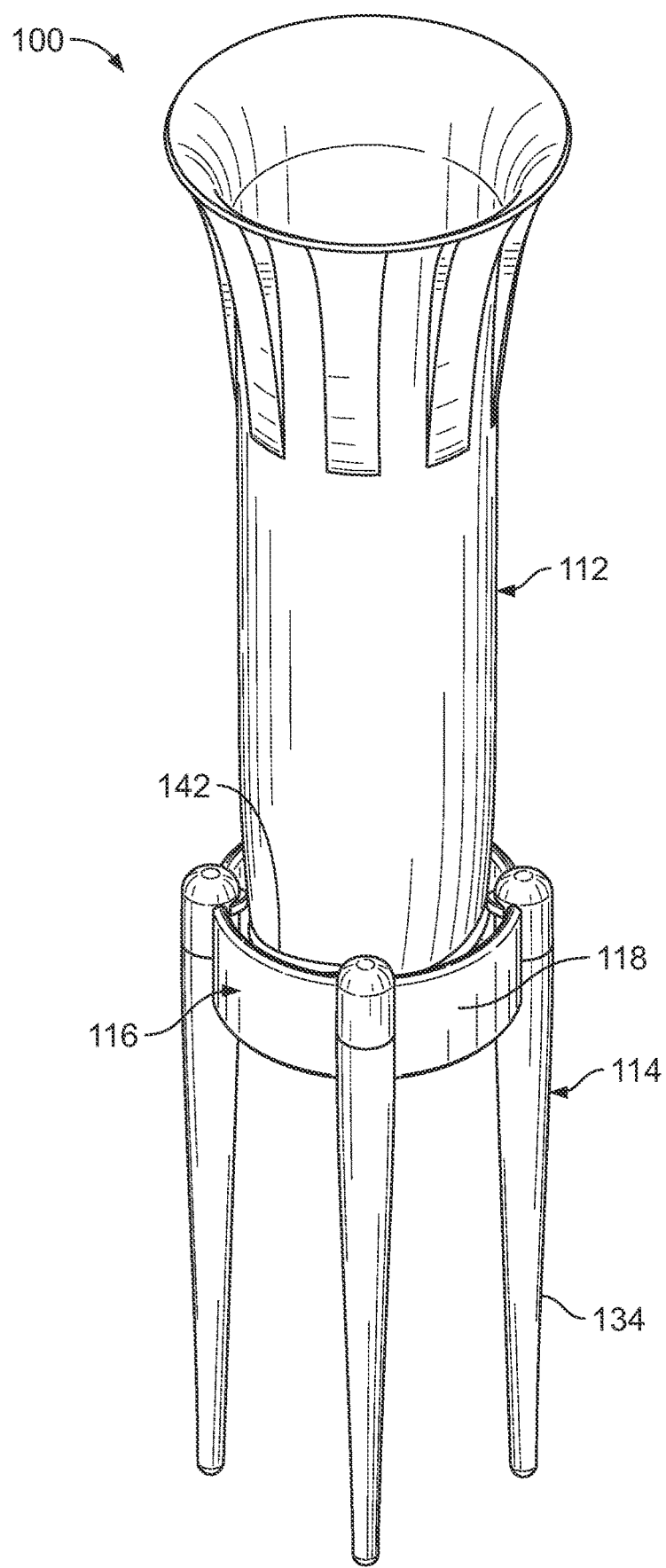
FIG. 6 is a perspective view of another floral display assembly constructed in accordance with the present teachings, the floral display assembly shown in a first, use orientation.
Figure 6A:
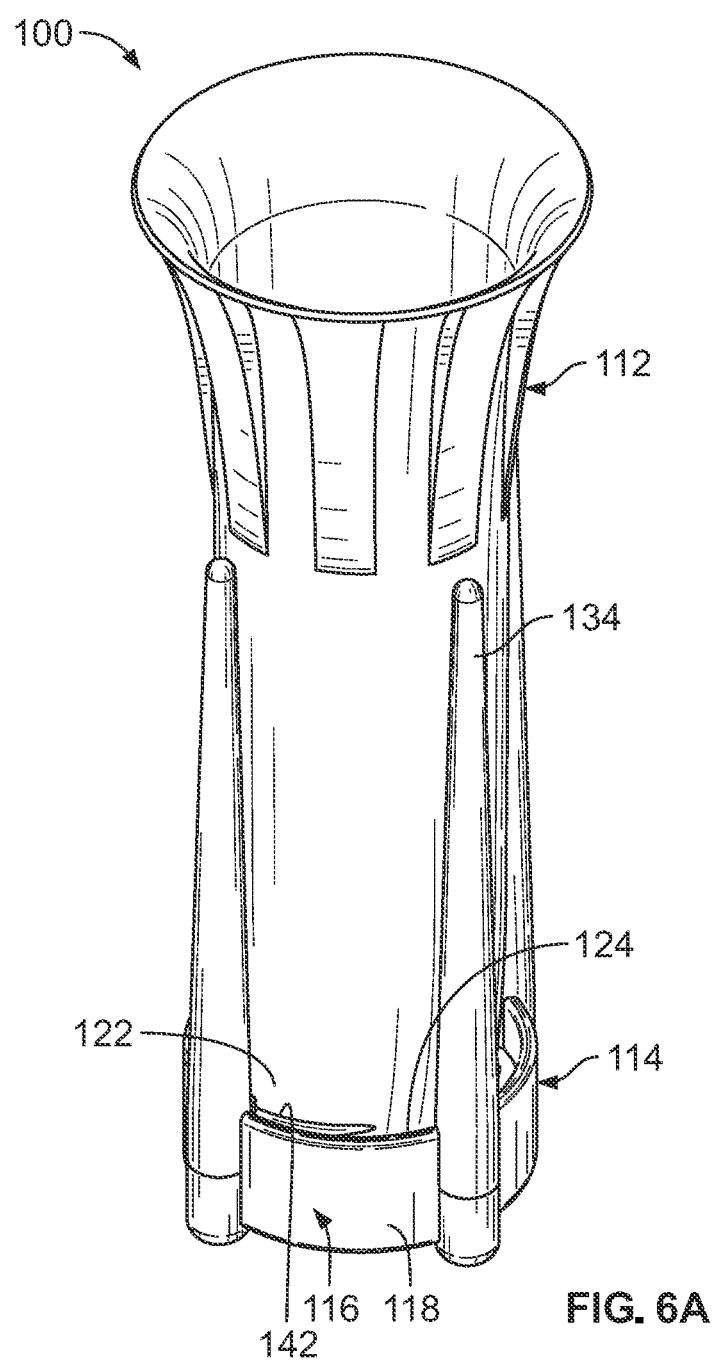
FIG. 6A is another perspective view of the floral display assembly of FIG. 6 illustrating the floral display assembly in a second, shipping orientation with the vase proper nested within the spikes of the mounting stand.
Figure 7:
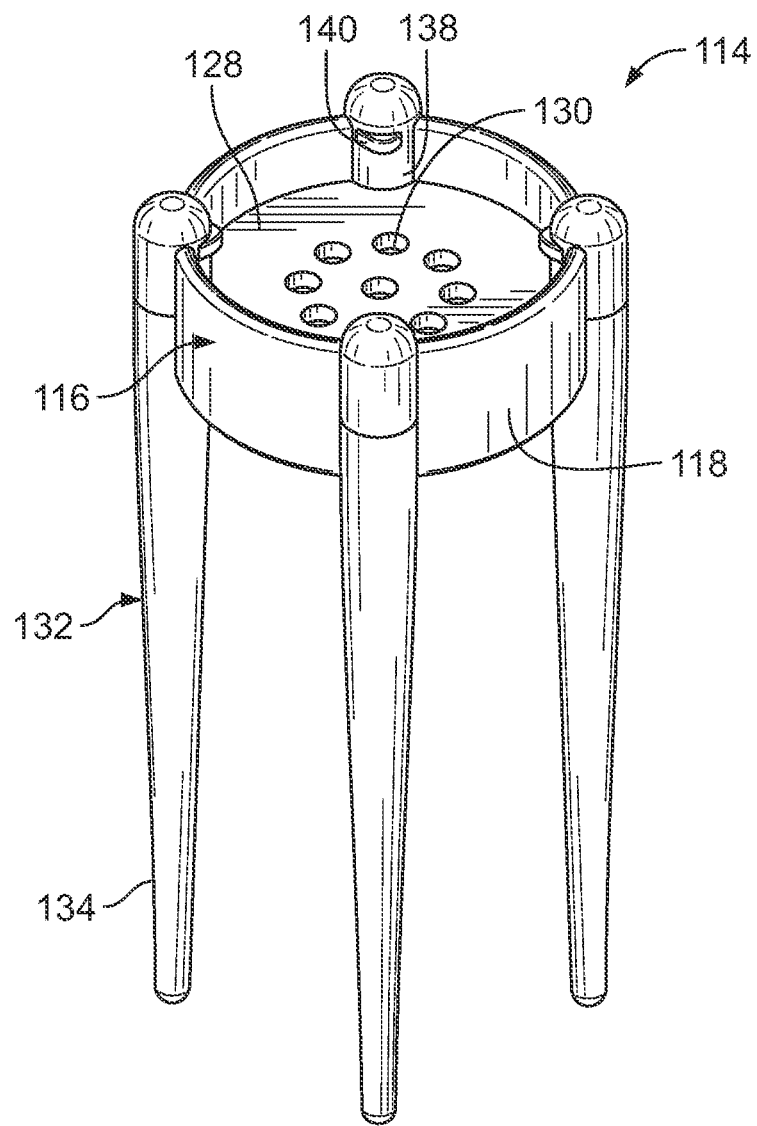
FIG. 7 is a mounting stand of the floral display assembly of FIG. 6.
Figure 8:
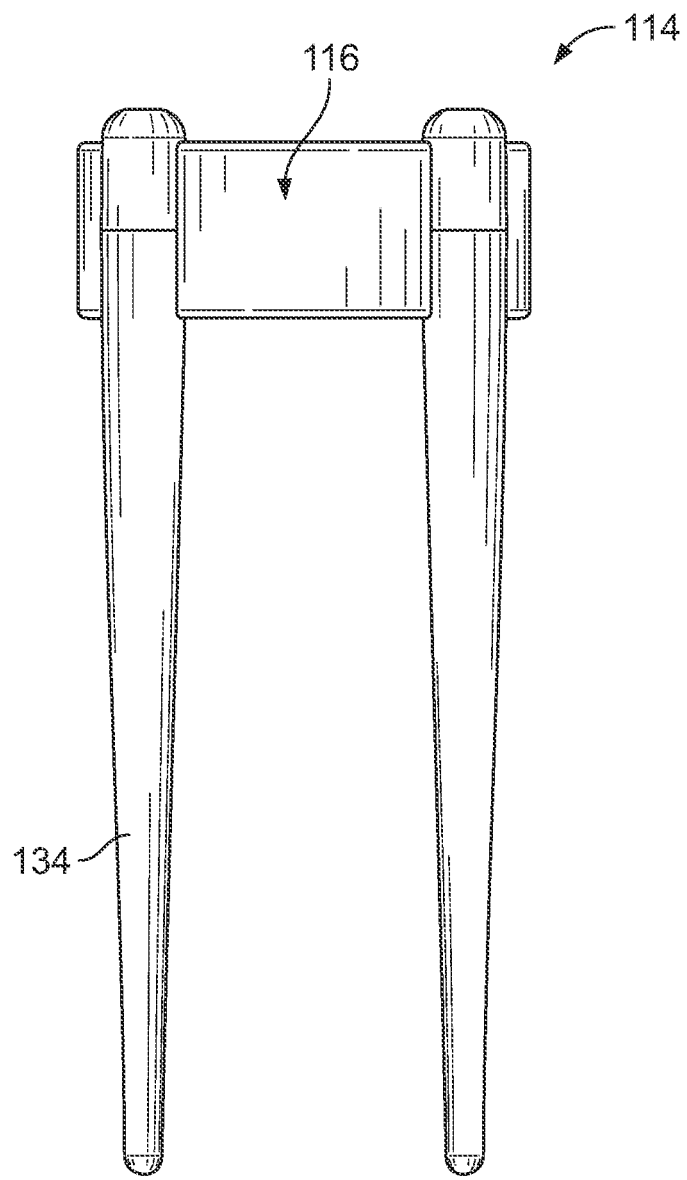
FIG. 8 is a side view of the mounting stand of FIG. 7.
Figure 9:
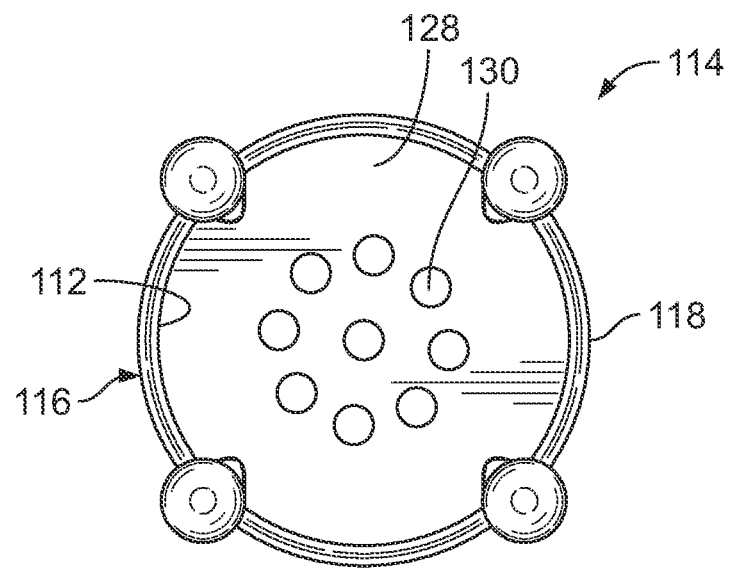
FIG. 9 is a top view of the mounting stand of FIG. 7.
Figure 10:
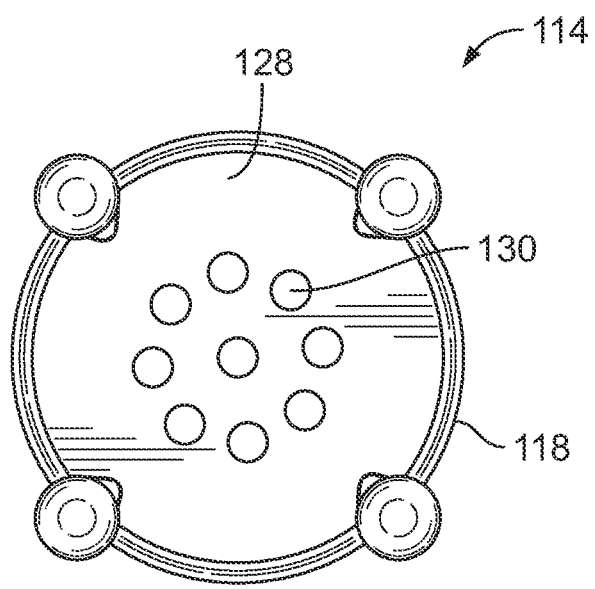
FIG. 10 is a bottom view of the mounting stand of FIG. 7.
Figure 11:
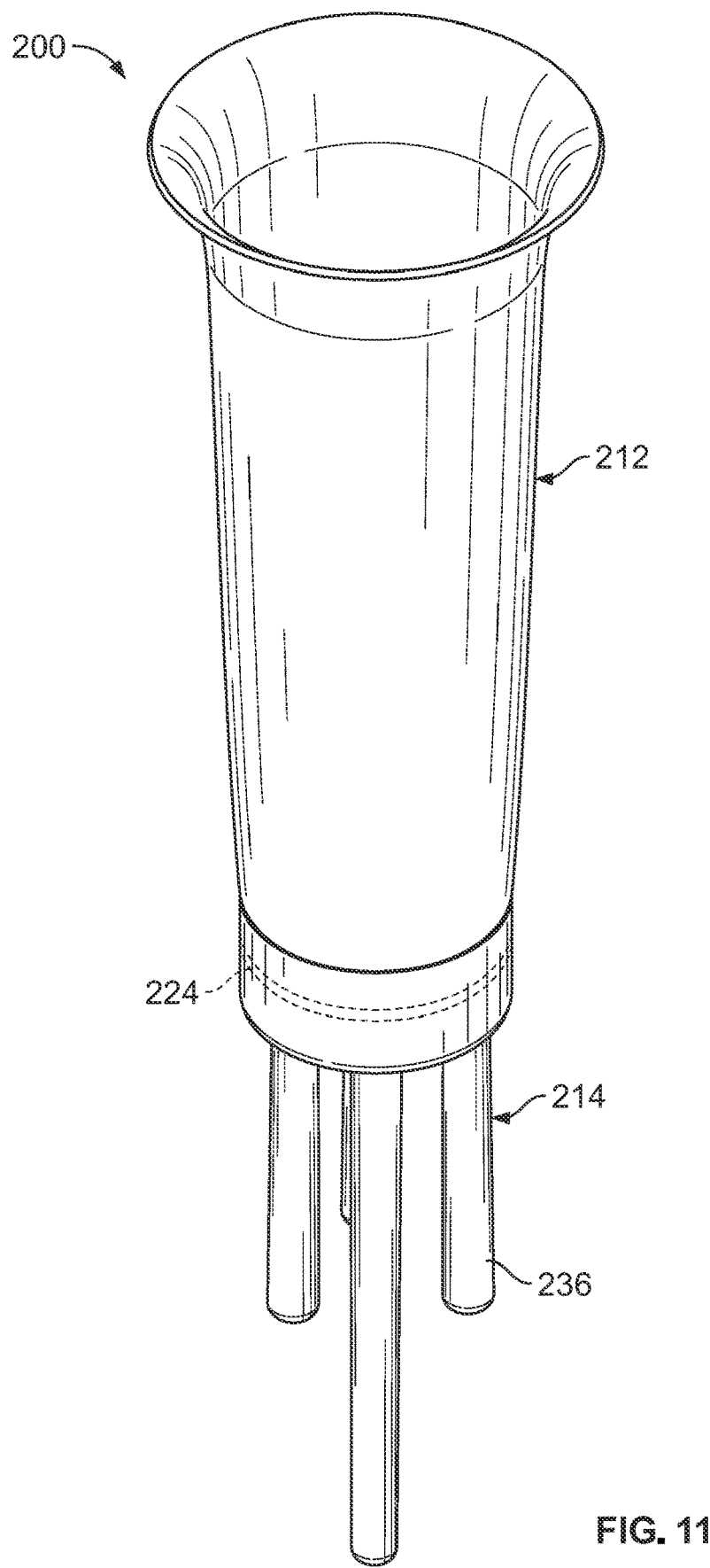
FIG. 11 is a perspective view of another floral display assembly constructed in accordance with the present teachings.
Figure 12:
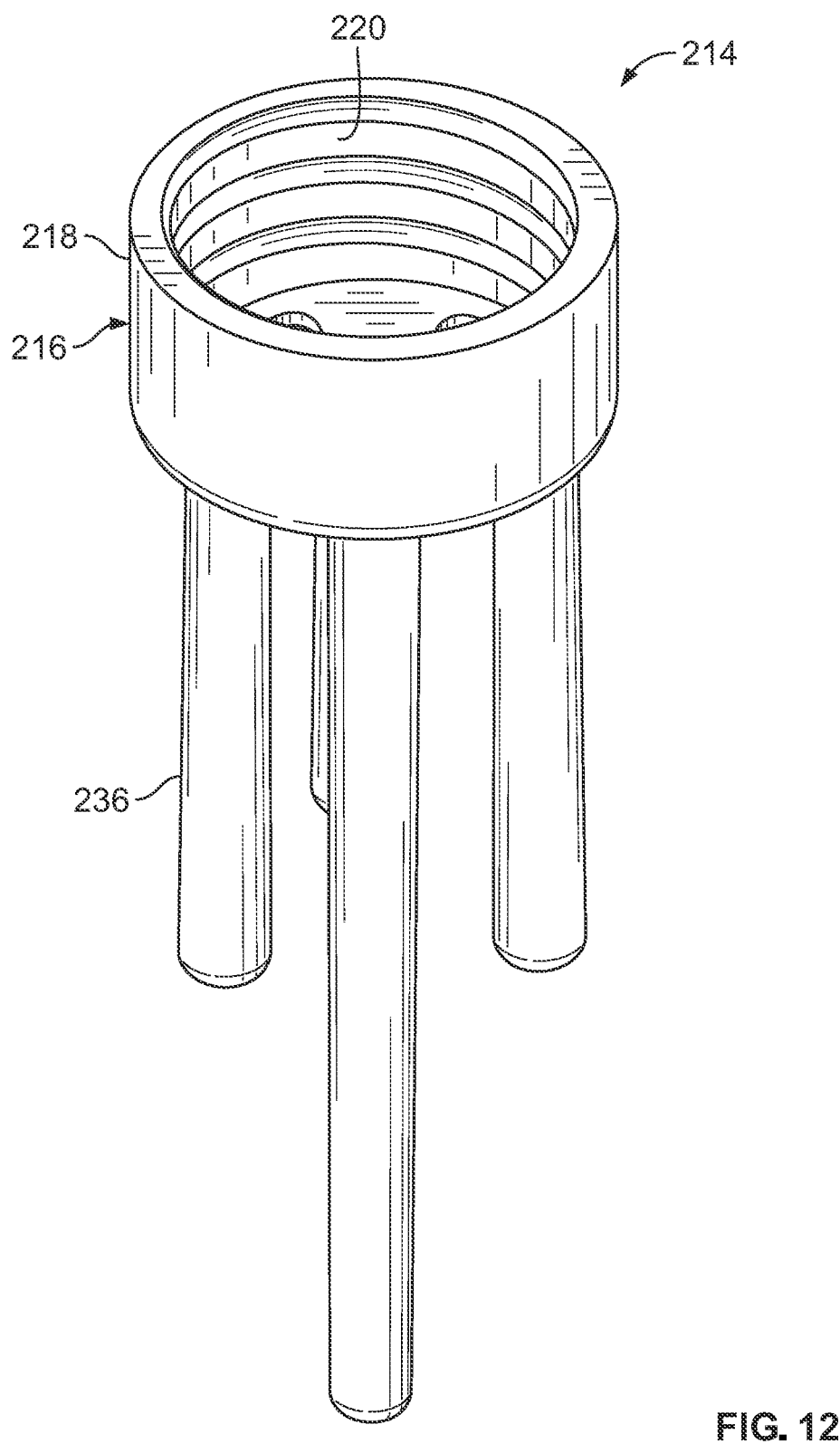
FIG. 12 is a mounting stand of the floral display assembly of FIG. 11.
Figure 13:
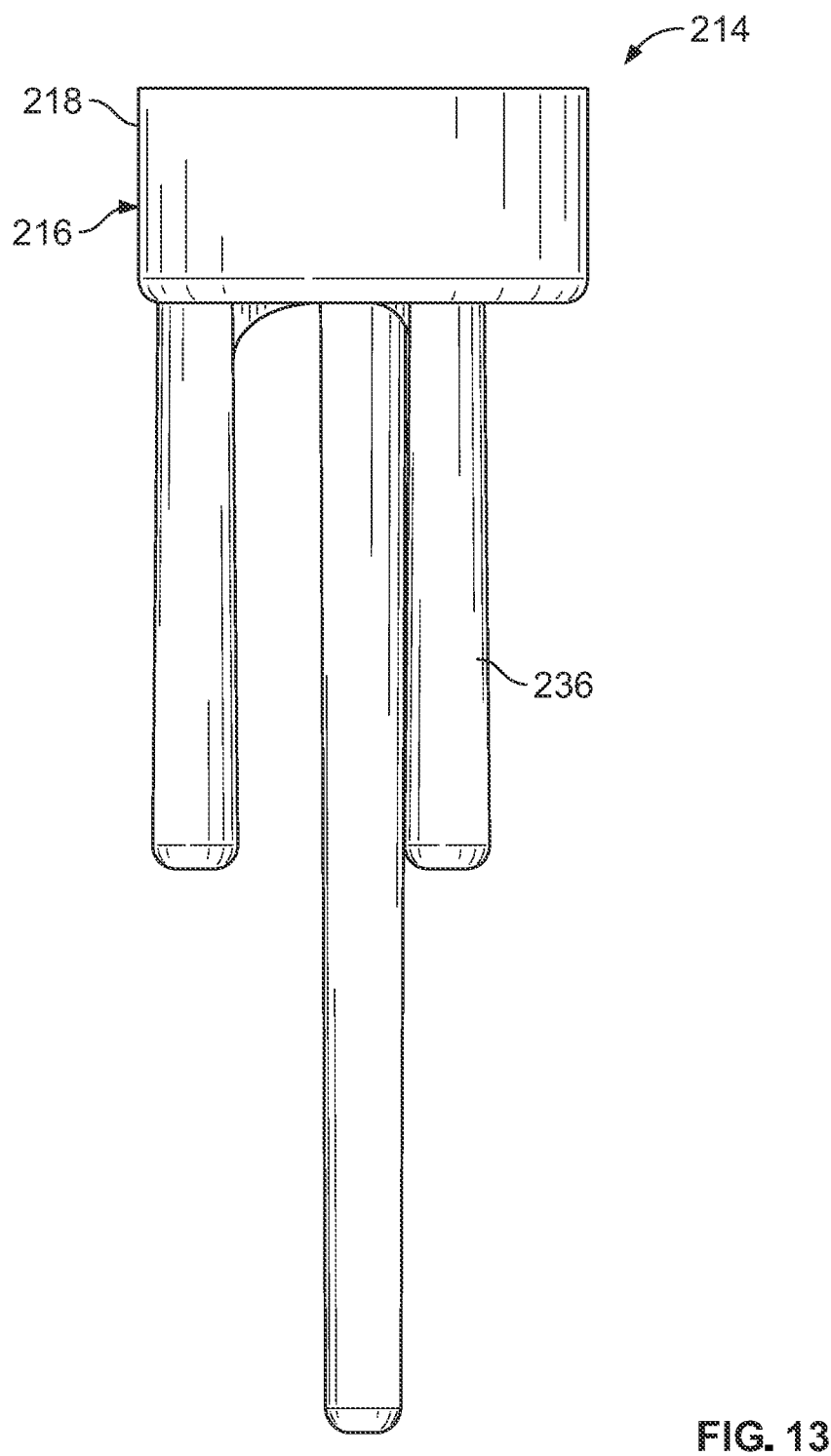
FIG. 13 is a side view of the mounting stand of FIG. 12.
Figure 14:
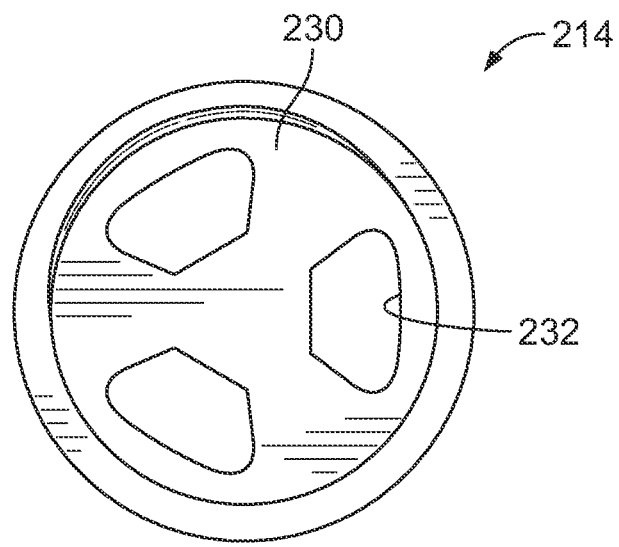
FIG. 14 is a top view of the mounting stand of FIG. 12.
Figure 15:
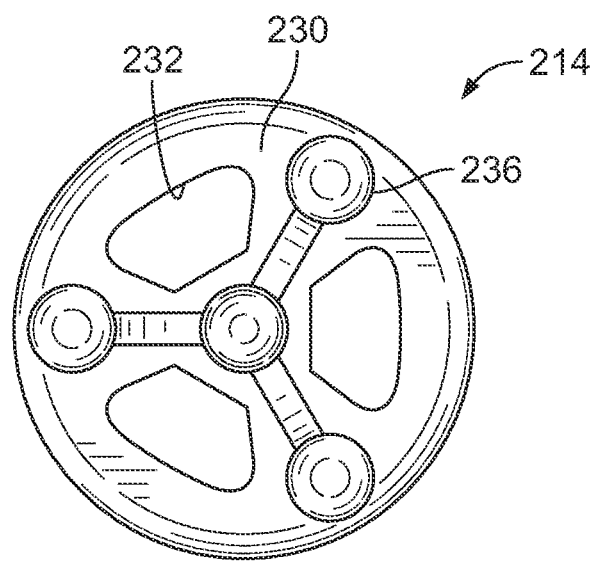
FIG. 15 is a bottom view of the mounting stand of FIG. 12.
Figure 16:
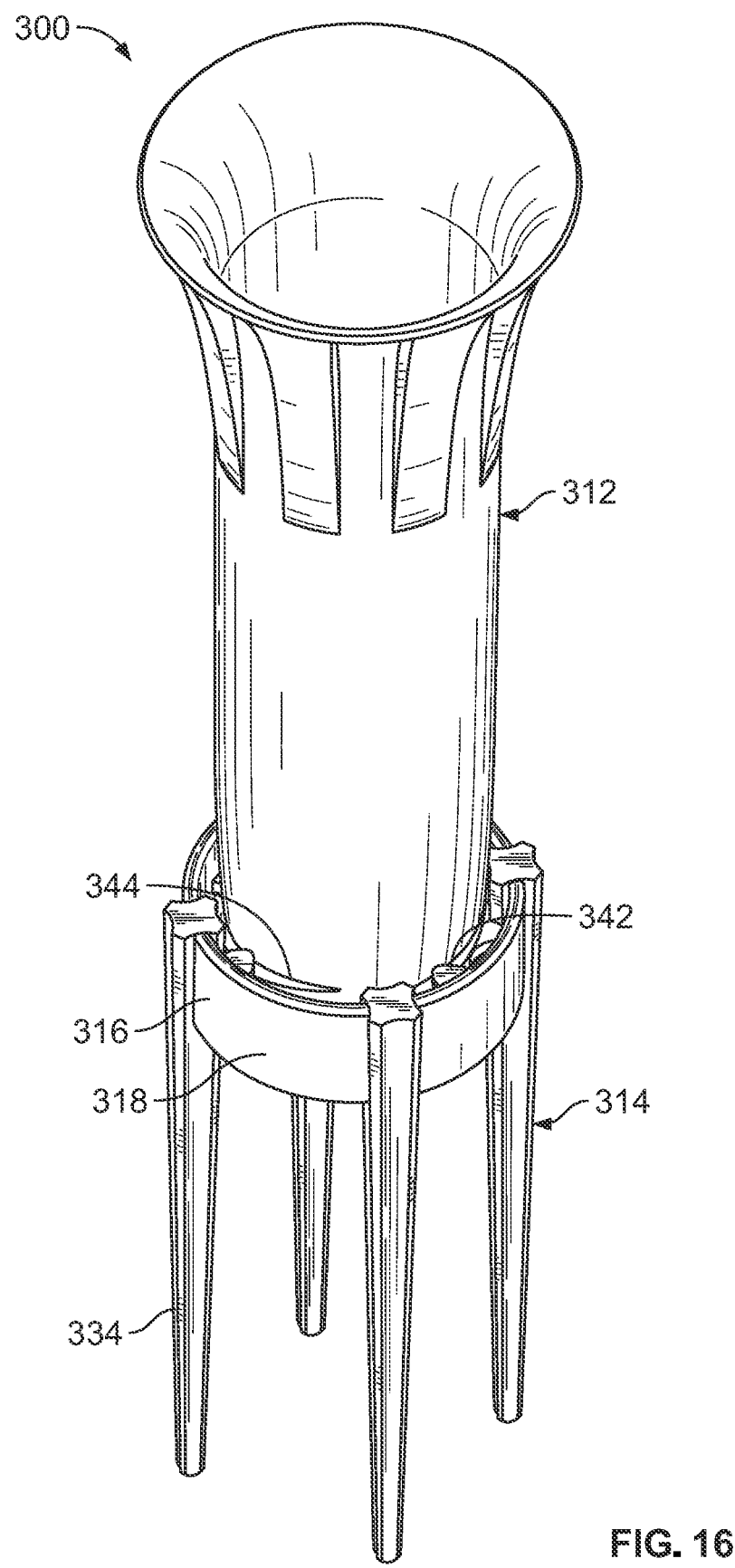
FIG. 16 is a perspective view of another floral display assembly constructed in accordance with the present teachings.
Figure 17:
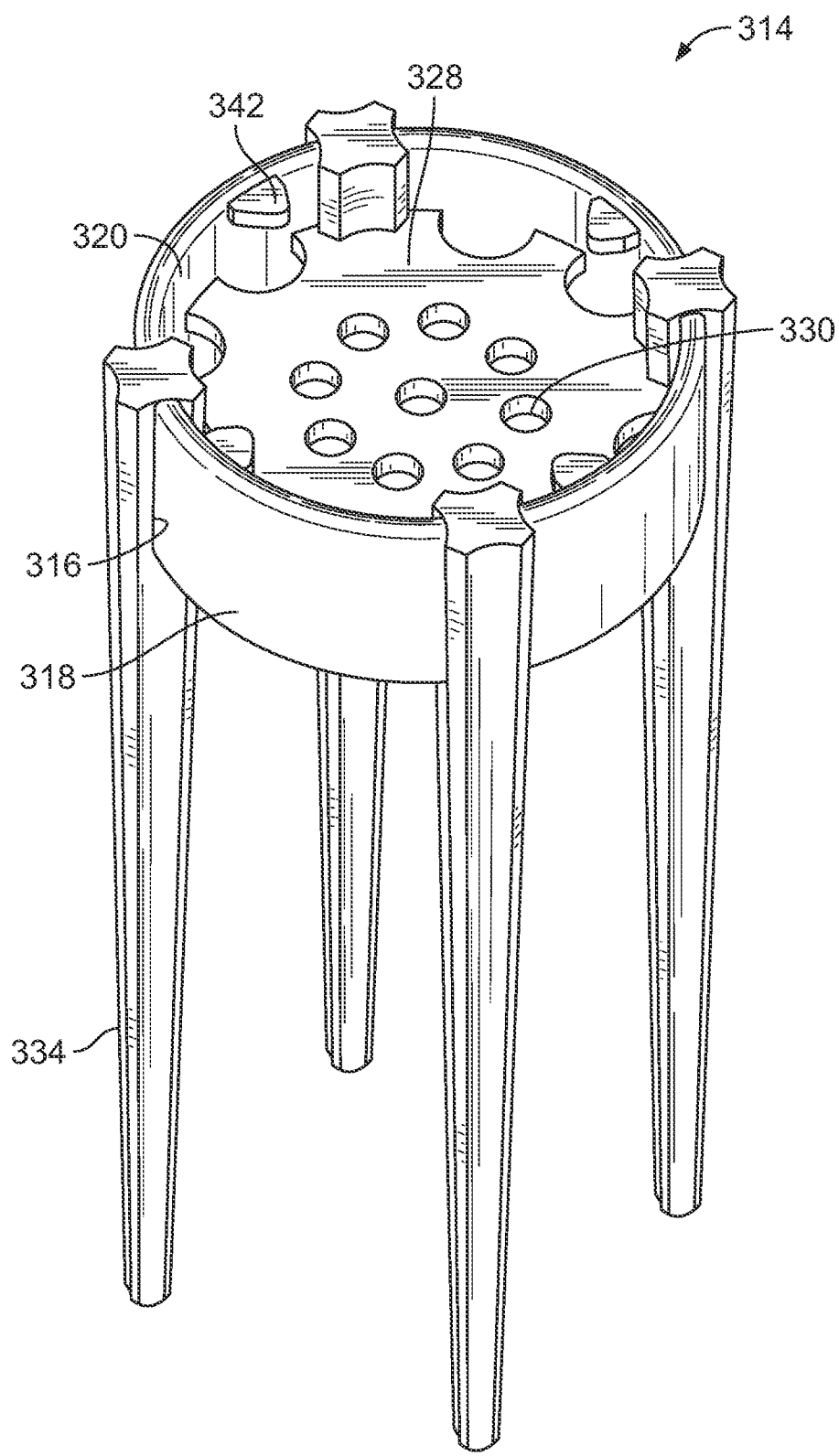
FIG. 17 is a mounting stand of the floral display assembly of FIG. 16.
Figure 18:
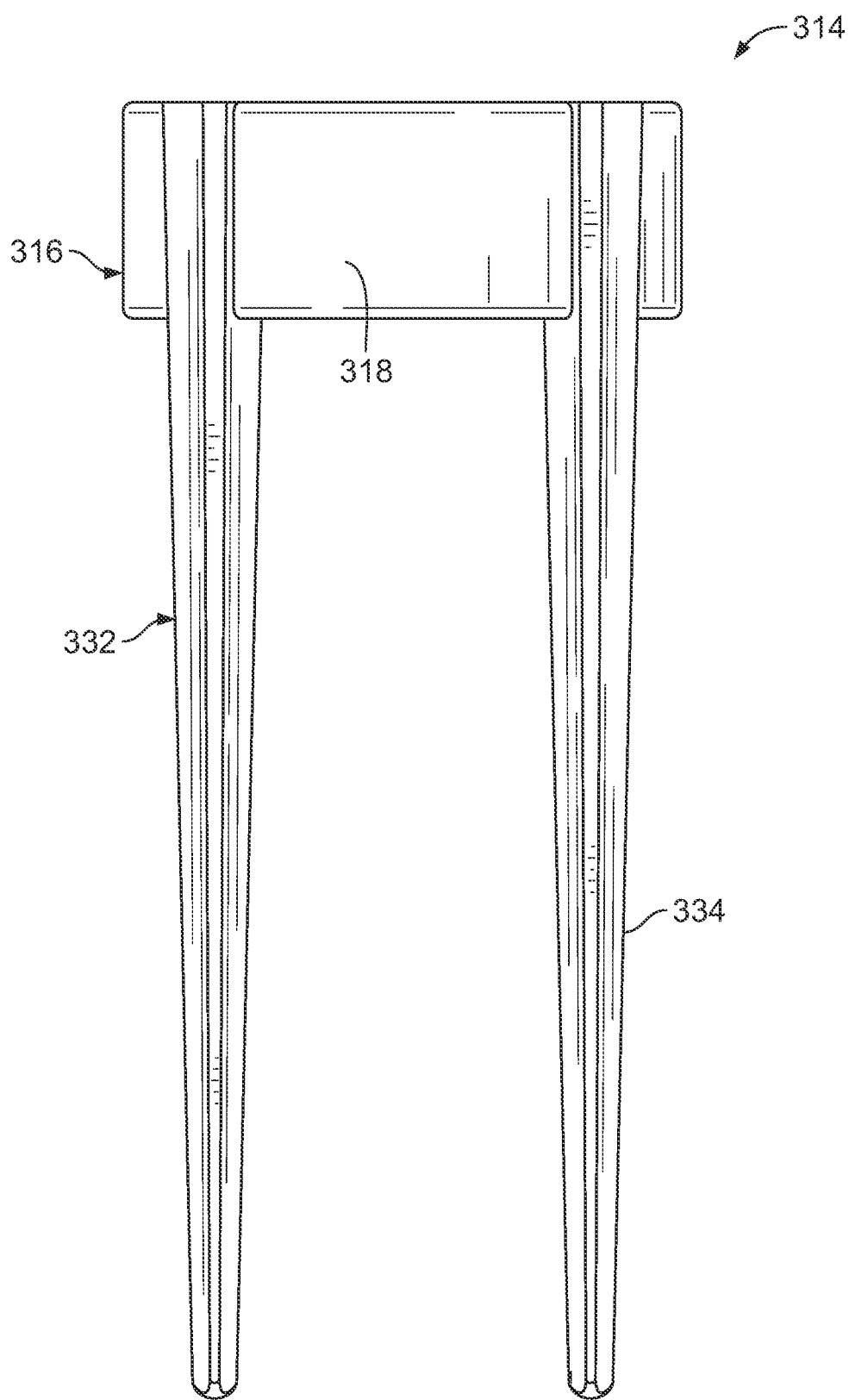
FIG. 18 is a side view of the mounting stand of FIG. 17.
Figure 19:
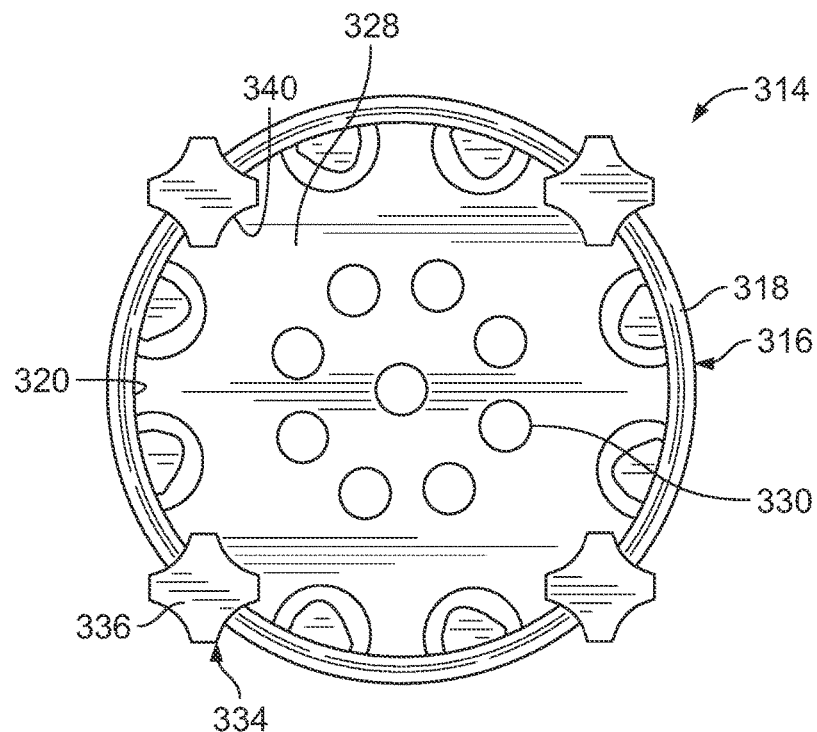
FIG. 19 is a top view of the mounting stand of FIG. 17.
Figure 20:
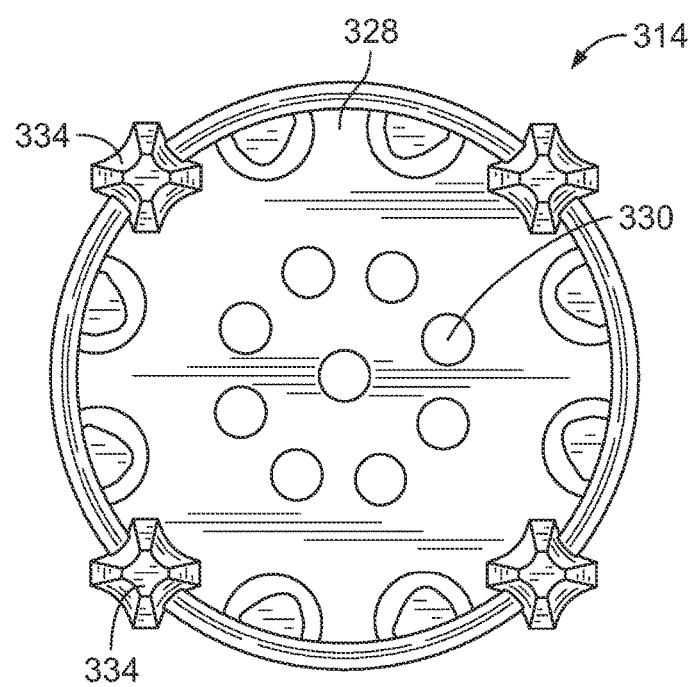
FIG. 20 is a bottom view of the mounting stand of FIG. 17.
Figure 21:
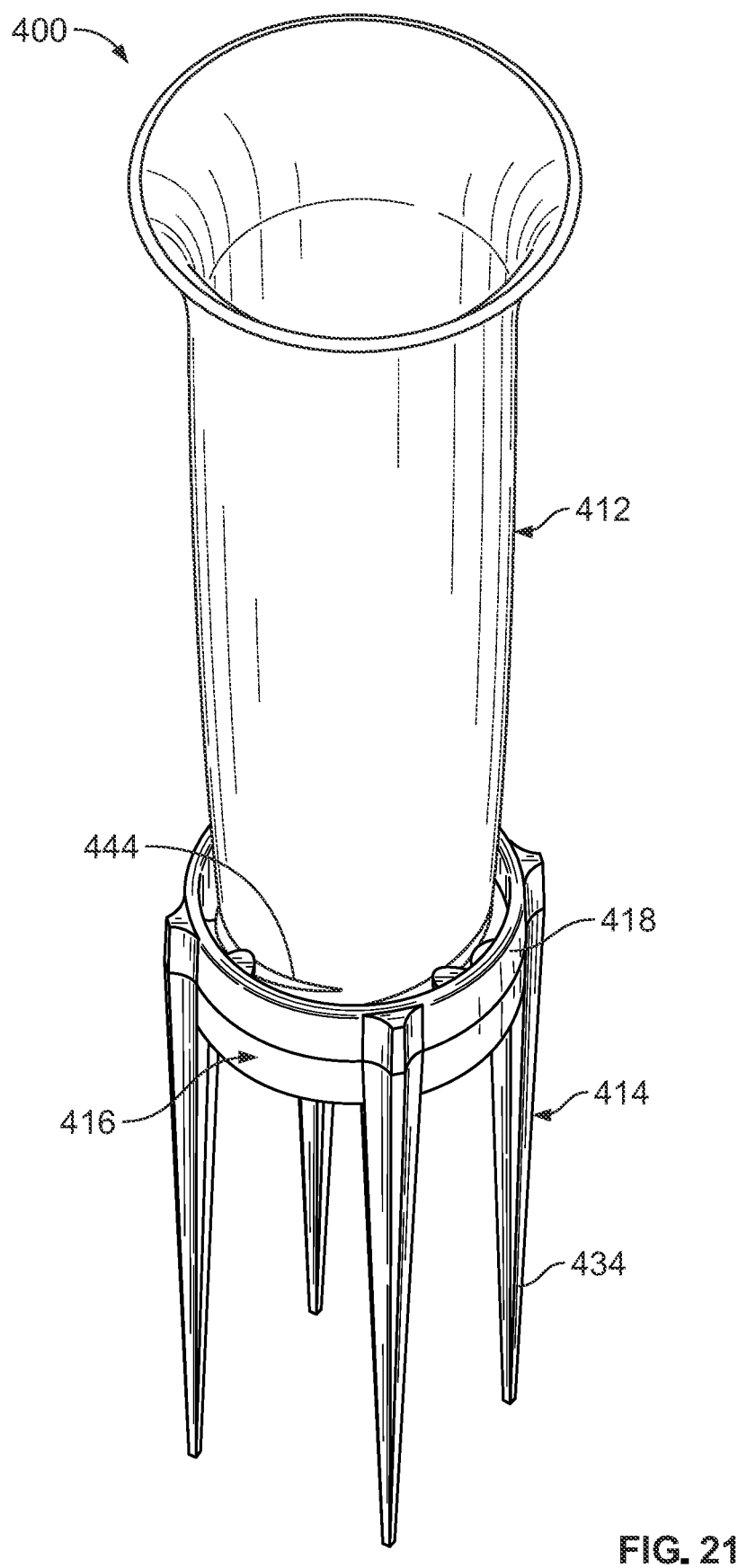
FIG. 21 is a perspective view of another floral display assembly constructed in accordance with the present teachings.

In FIG. 6, the vase 100 is shown in a first, use orientation. In FIG. 6A, the vase 100 is shown in a second, shipping orientation. In the second orientation, the vase proper 112 is nested within the spikes 134 of the mounting stand 114 to effectively reduce an axial length of the vase 100. It will be understood that the other embodiments herein may be similarly configured in such a second, shipping orientation.

Turning to FIGS. 11-15, another floral display assembly constructed in accordance with the teachings of the present invention is illustrated and generally identified at reference character 200. Again, the floral display assembly may be a cemetery vase 200 having a two-part construction including a vase proper 212 and mounting stand or base 214. The vase proper 212 and the mounting stand 214 may both be formed of injection molded plastic or any other suitable material. In FIGS. 12-15, the vase proper 212 has been removed for purposes of illustration. It will be understood the vase proper 212 may have a different configuration within the scope of the present teachings.

The mounting stand 214 includes a top portion or connection portion 216 adapted to interface with cooperating features of the vase proper 212. As illustrated, the connection portion 216 may have a generally cylindrical sidewall 218 defining a female opening 220. The female opening 220 may include a thread 222 for cooperating with a corresponding thread 224 formed at a bottom of the vase proper 212. The vase proper 212 may be inserted into the female opening 220 of the connection portion 216 and rotated relative to the mounting stand 214 to couple the vase proper 212 and the mounting stand 214 in a threaded or thread-like manner.

The cylinder of the connection portion 216 may be closed at a lower side by a radially extending disk 230. The radially extending disk 230 may be formed with a plurality of holes 232 axially extending therethrough for the drainage of water.

The mounting stand 214 may include a lower portion 234 defined by a plurality of downwardly extending legs or spikes 236. In the embodiment illustrated, the lower portion 234 is defined by four spikes 236. The lower portion 234 may alternatively include a greater or lesser number of spikes 236 within the scope of the present teachings.

Turning to FIGS. 16-20, another floral display assembly constructed in accordance with the teachings of the present invention is illustrated and generally identified at reference character 300. Again, the floral display assembly may be a cemetery vase 300 having a two-part construction including a vase proper 312 and mounting stand or base 314. The vase proper 312 and the mounting stand 214 may both be formed of injection molded plastic or any other suitable material. In FIGS. 17-20, the vase proper 312 has been removed for purposes of illustration. It will be understood the vase proper 312 may have a different configuration within the scope of the present teachings.

The mounting stand 314 includes a top portion or connection portion 316 adapted to interface with cooperating features of the vase proper 312. As illustrated, the connection portion 316 has a generally cylindrical sidewall 318 defining a female opening 320 for receiving a male portion defined at the bottom of the vase proper 312.

The connection portion 316 may closed at a lower end by a circular disk 328. The disk 328 extends in a radial direction and may be formed with a plurality of holes 330 axially extending there through for the drainage of water.

The mounting stand 314 may include a lower portion 332 defined by a plurality of downwardly extending legs or spikes 334. In the embodiment illustrated, the lower portion is defined by four spikes 334. The lower portion 332 may alternatively include a greater or lesser number of spikes 334 within the scope of the present teachings. Upper ends of the spikes 334 may intersect the generally cylindrical sidewall 318 of the connection portion 316. An inner side 340 of each upper end may define an arcuate face abutting the vase proper 312 and cooperating with the vase proper 312 to center the vase proper 312 within the opening 320.

The connection portion 316 may further include a plurality of detents 342 that inwardly extend into the opening 320. The detents 342 cooperates with a flange 344 formed on or otherwise carried at the bottom of the vase proper 312 to maintain a connection between the mounting stand 314 and the vase proper 312. The flange 344 may extend spirally around at least a portion of the vase proper 312. The vase proper 312 may be inserted into the female opening 320 of the connection portion 316 and rotated relative to the mounting stand 314 to couple the vase proper 312 and the mounting stand 314 in a threaded or thread-like manner.

Figure 22:
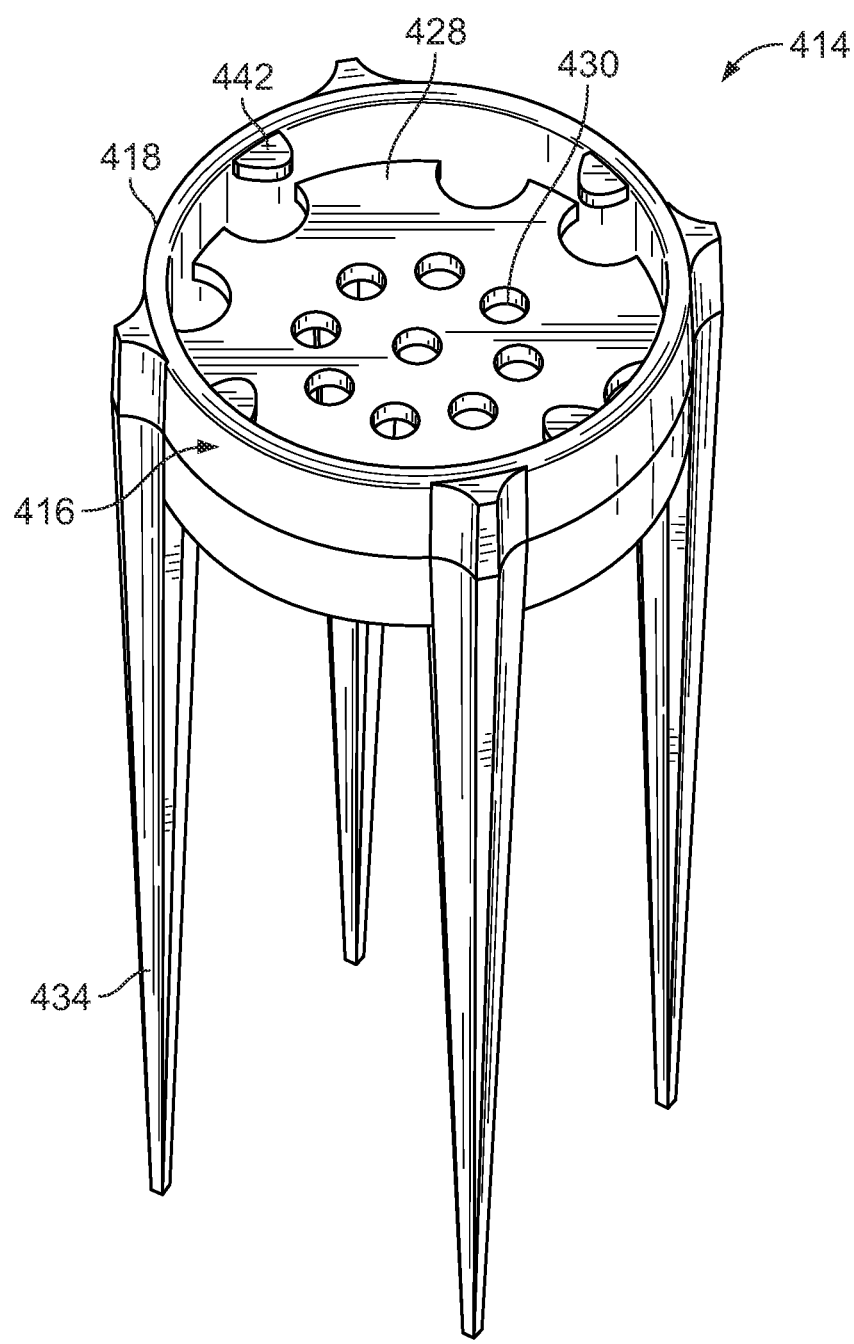
FIG. 22 is a mounting stand of the floral display assembly of FIG. 17.
Figure 23:
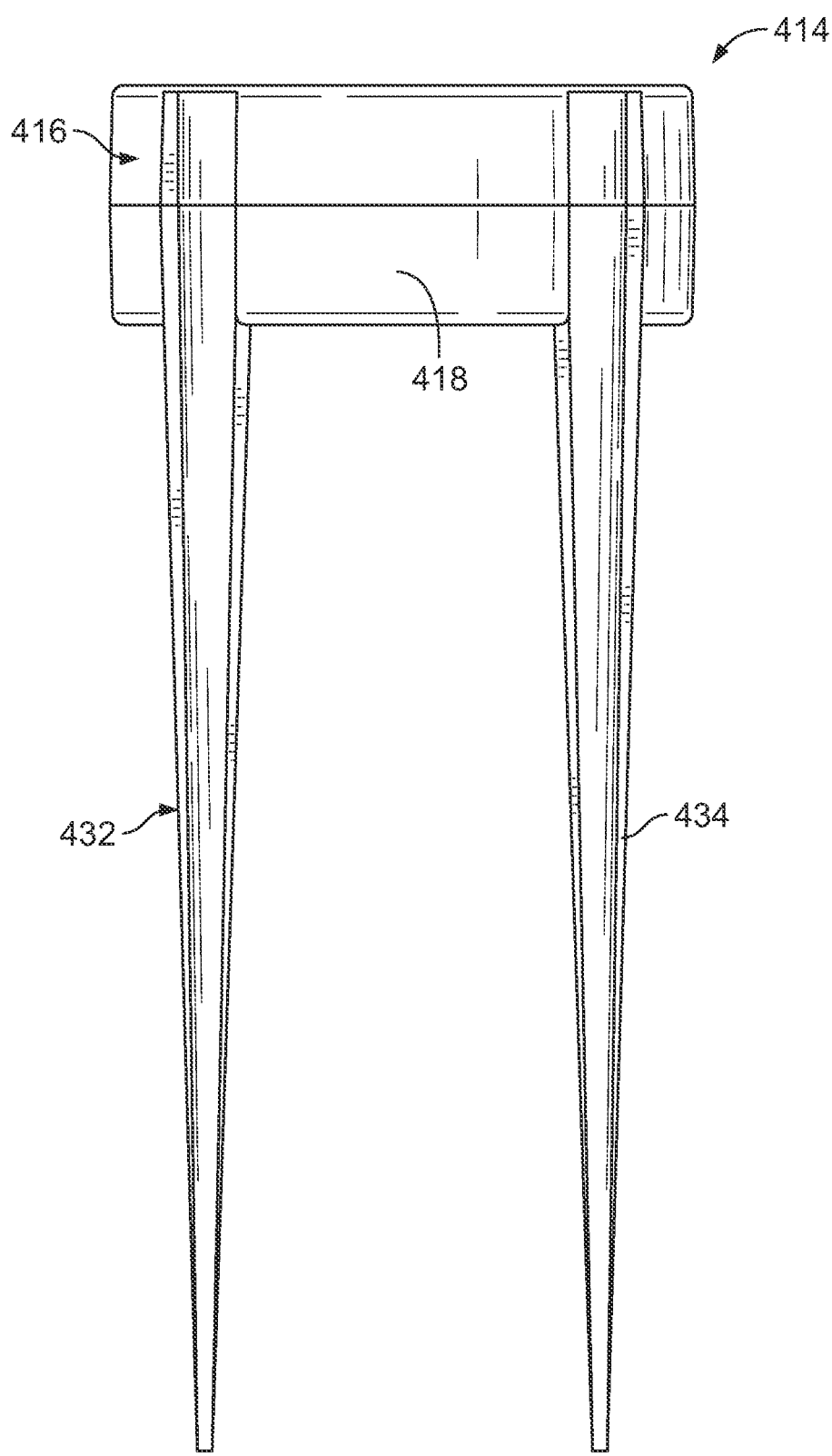
FIG. 23 is a side view of the mounting stand of FIG. 22.
Figure 24:
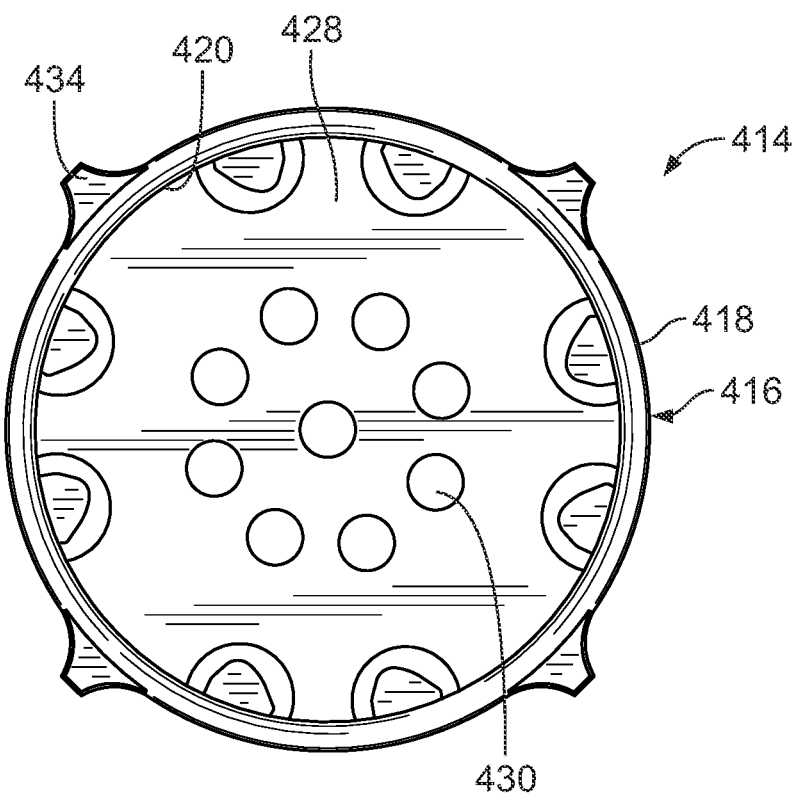
FIG. 24 is a top view of the mounting stand of FIG. 22.
Figure 25:
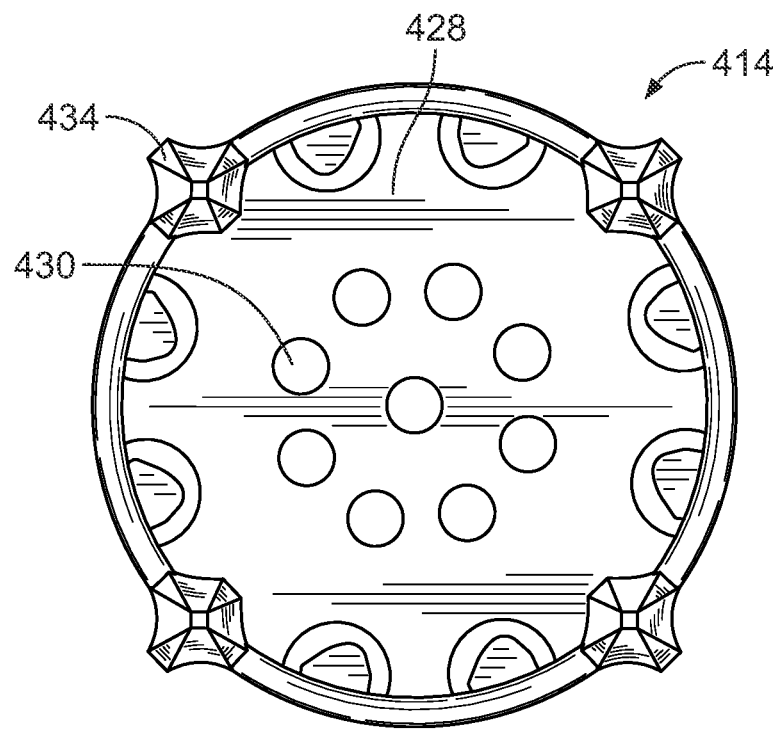
FIG. 25 is a bottom view of the mounting stand of FIG. 22.

Turning to FIGS. 21-25, another floral display assembly constructed in accordance with the teachings of the present invention is illustrated and generally identified at reference character 400. Again, the floral display assembly may be a cemetery vase having a two-part construction including a vase proper 412 and mounting stand or base 414. The vase proper 412 and the mounting stand 414 may both be formed of injection molded plastic or any other suitable material. In FIGS. 22-24, the vase proper 412 has been removed for purposes of illustration. It will be understood the vase proper 412 may have a different configuration within the scope of the present teachings.

The mounting stand 414 includes a top portion or connection portion 416 adapted to interface with cooperating features of the vase proper 412. As illustrated, the connection portion 416 has a generally cylindrical sidewall 418 defining a female opening 420 for receiving a male portion defined at the bottom of the vase proper 412.

The connection portion 416 may closed at a lower end by a circular disk 428. The disk 428 extends in a radial direction and may be formed with a plurality of holes 430 axially extending there through for the drainage of water.

The mounting stand 414 may include a lower portion 432 defined by a plurality of downwardly extending legs or spikes 434. In the embodiment illustrated, the lower portion is defined by four spikes 434. The lower portion 432 may alternatively include a greater or lesser number of spikes 434 within the scope of the present teachings.

The connection portion 316 may further include a plurality of detents 442 that inwardly extend into the opening 420. The detents 442 cooperates with a flange 444 formed on or otherwise carried at the bottom of the vase proper 412 to maintain a connection between the mounting stand 414 and the vase proper 412. The flange 444 may extend spirally around at least a portion of the vase proper 412. The vase proper 412 may be inserted into the female opening 420 of the connection portion 416 and rotated relative to the mounting stand 414 to couple the vase proper 412 and the mounting stand 414 in a threaded or thread-like manner.

Figure 26:
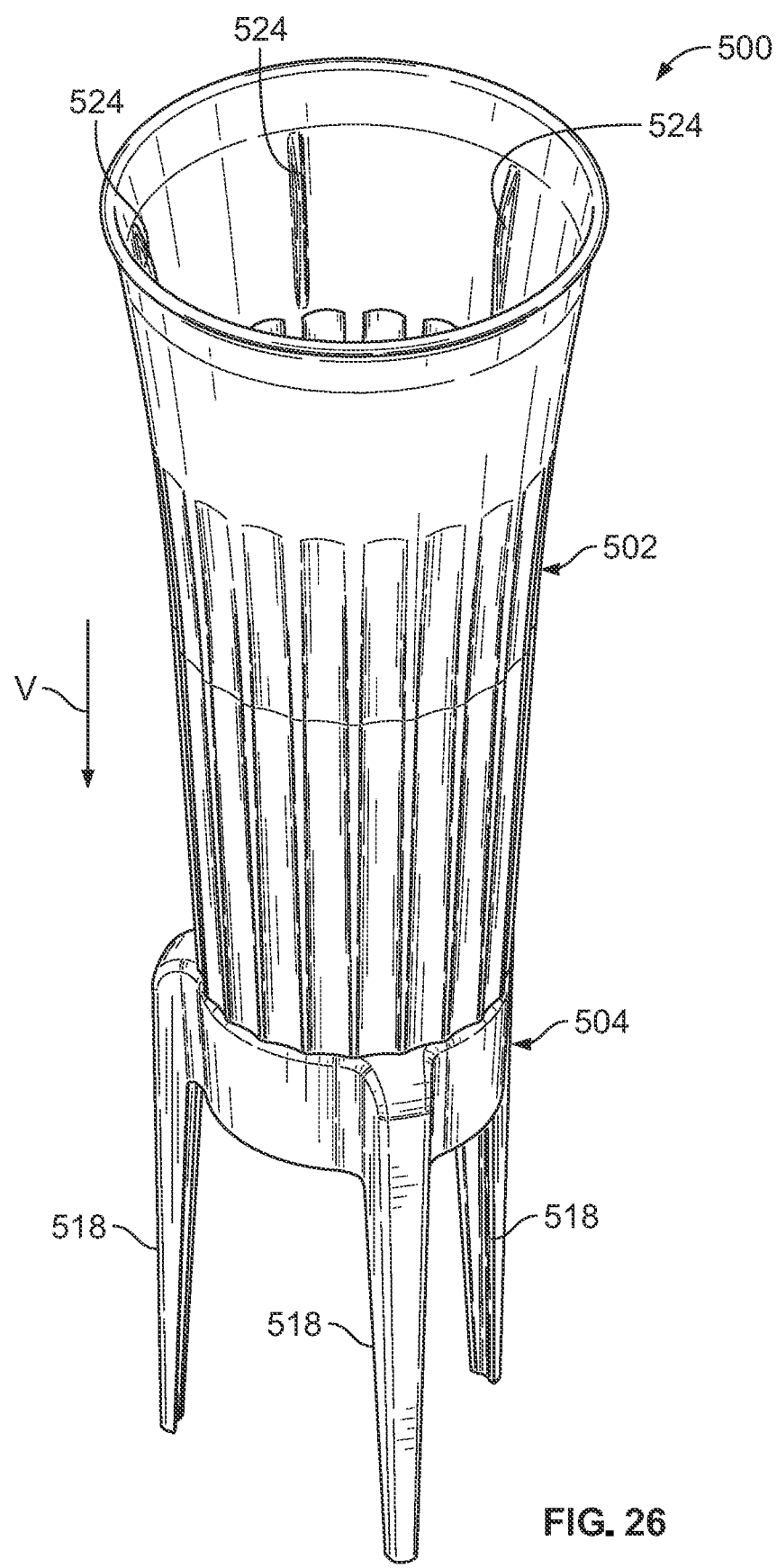
FIG. 26 is a perspective view of another floral display assembly constructed in accordance with the present teachings.
Figure 26A:
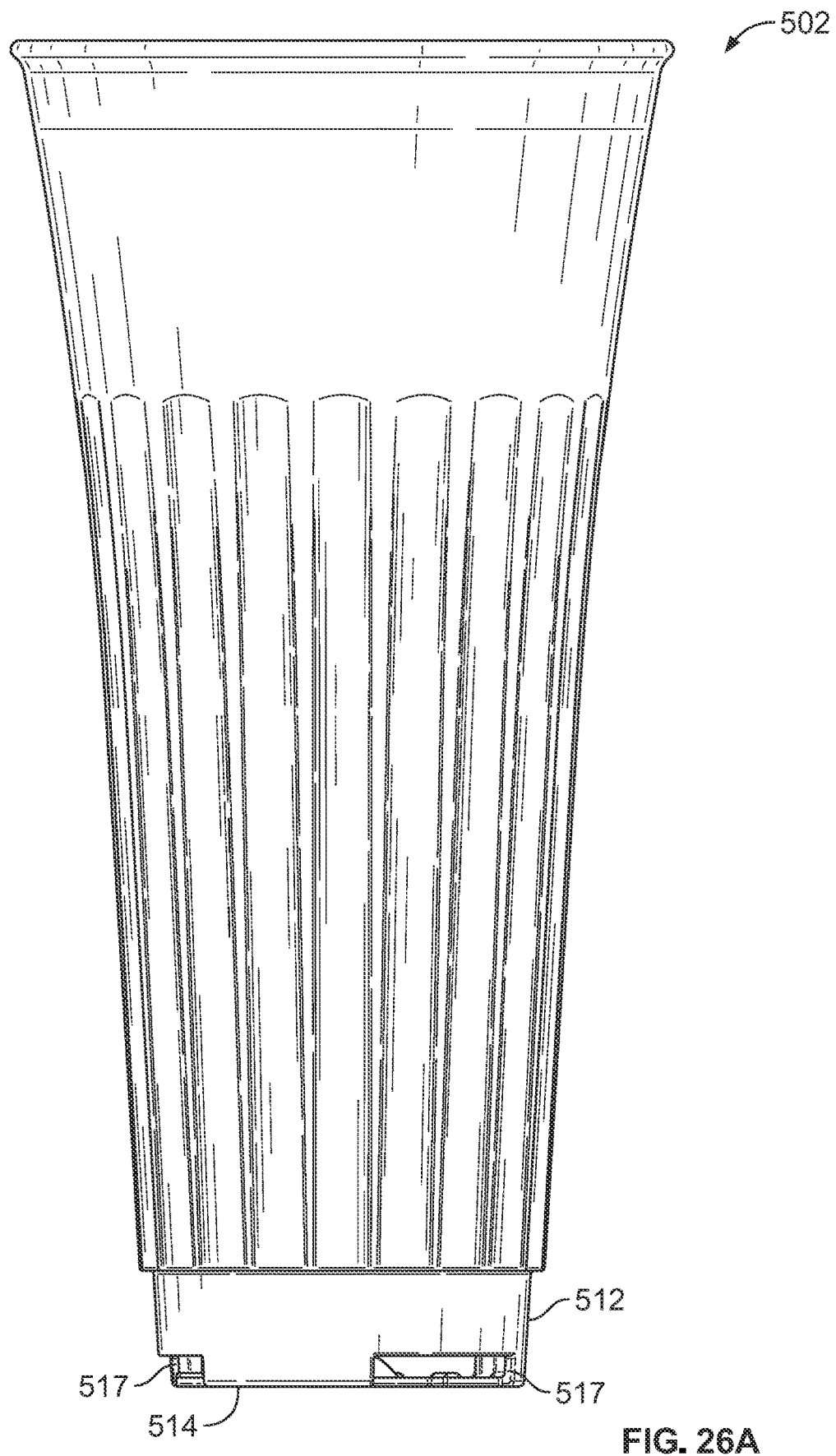
FIG. 26A is a side view of a vase proper of the floral display assembly of FIG. 26.
Figure 26B:
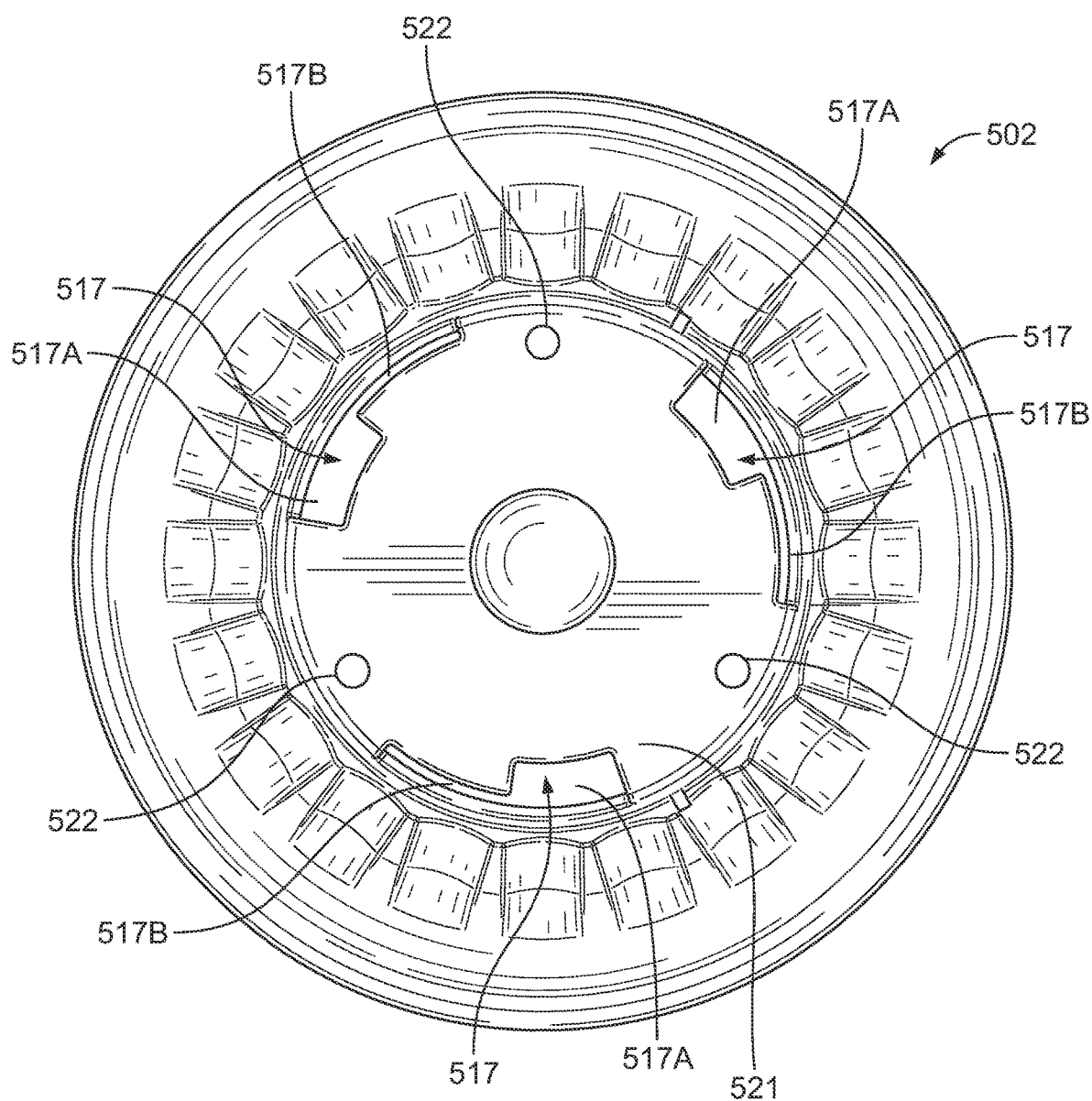
FIG. 26B is a bottom view of the vase proper of the floral display assembly of FIG. 26.
Figure 27:
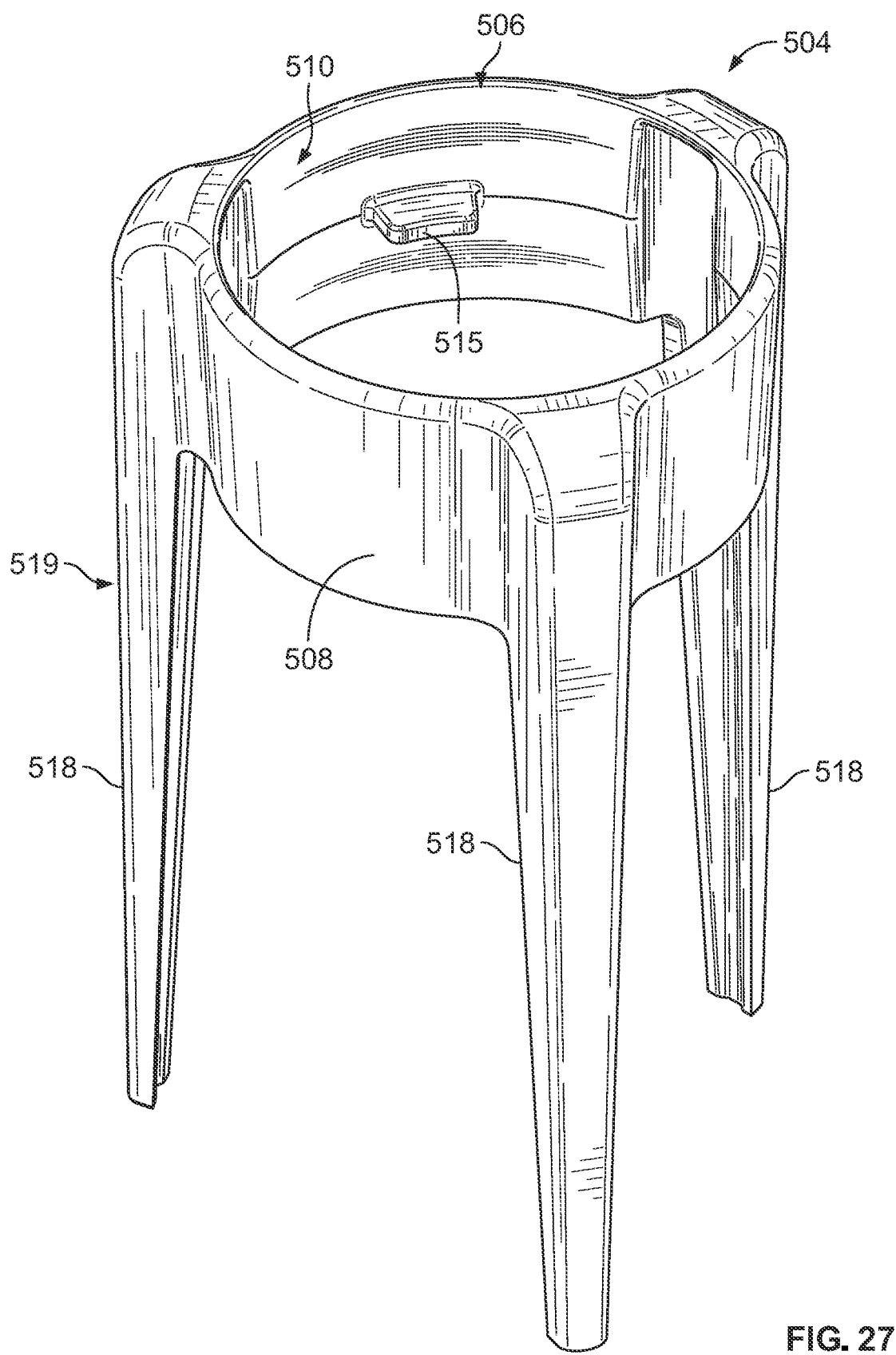
FIG. 27 is a perspective view of a mounting stand of the floral display assembly of FIG. 26.
Figure 28:
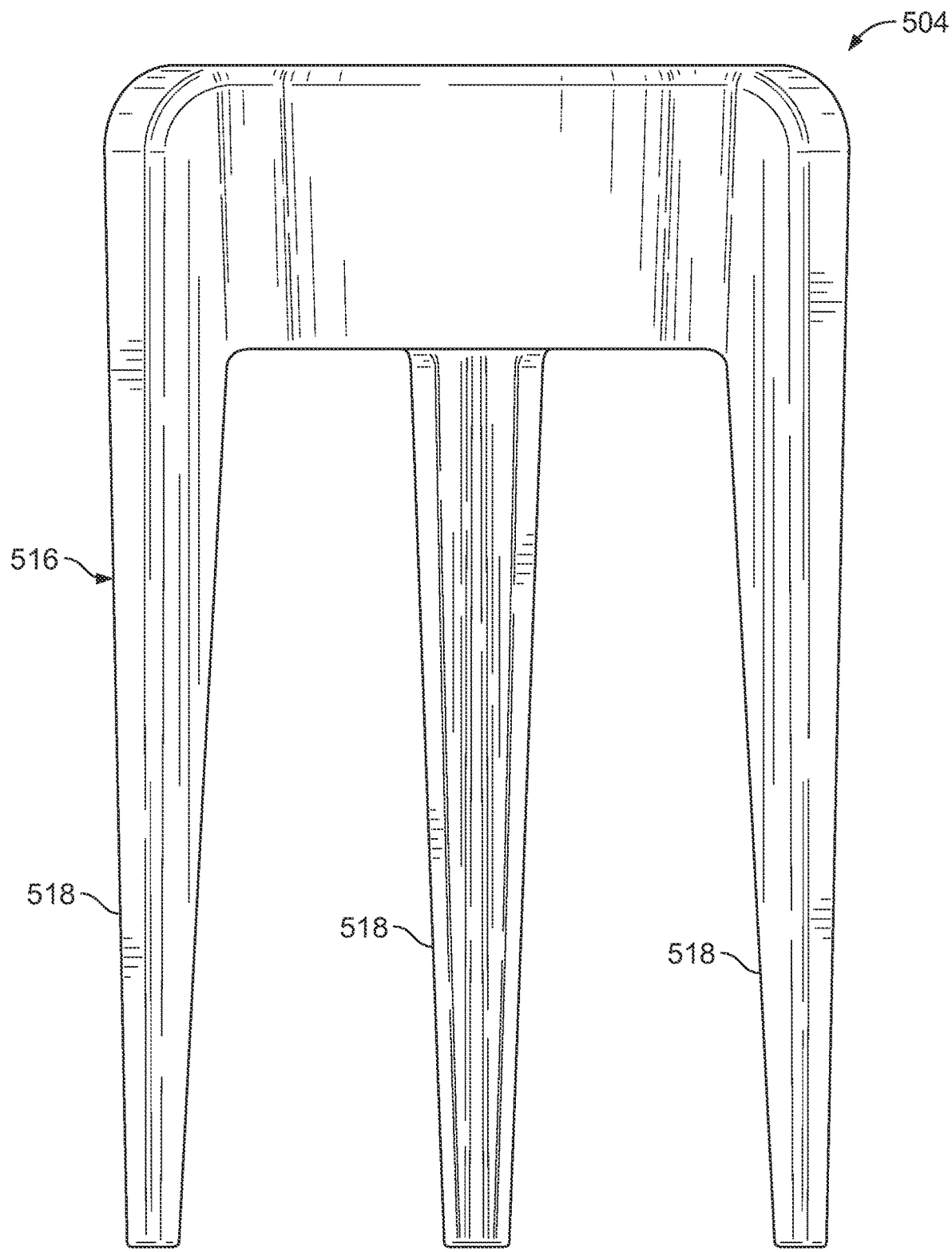
FIG. 28 is a side view of the mounting stand of FIG. 27.
Figure 29:
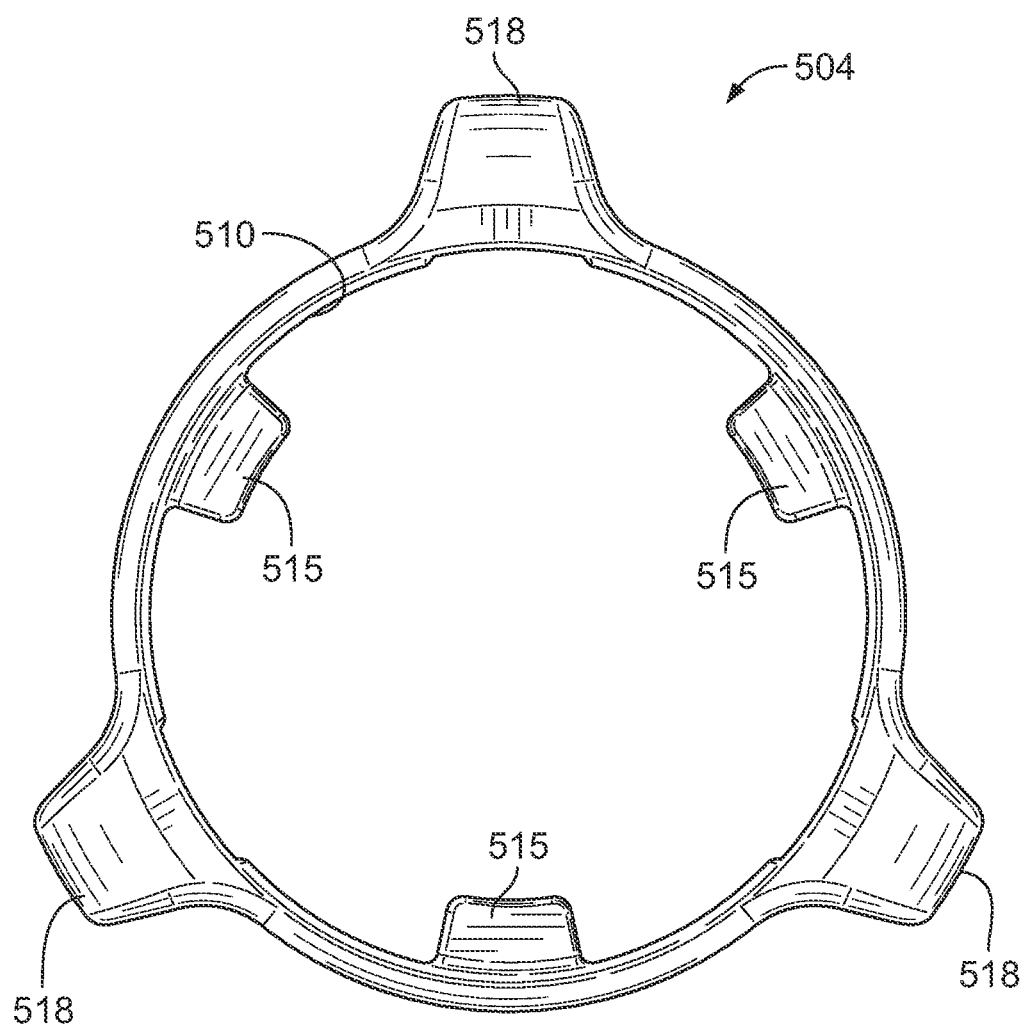
FIG. 29 is a top view of the mounting stand of FIG. 27.
Figure 30:
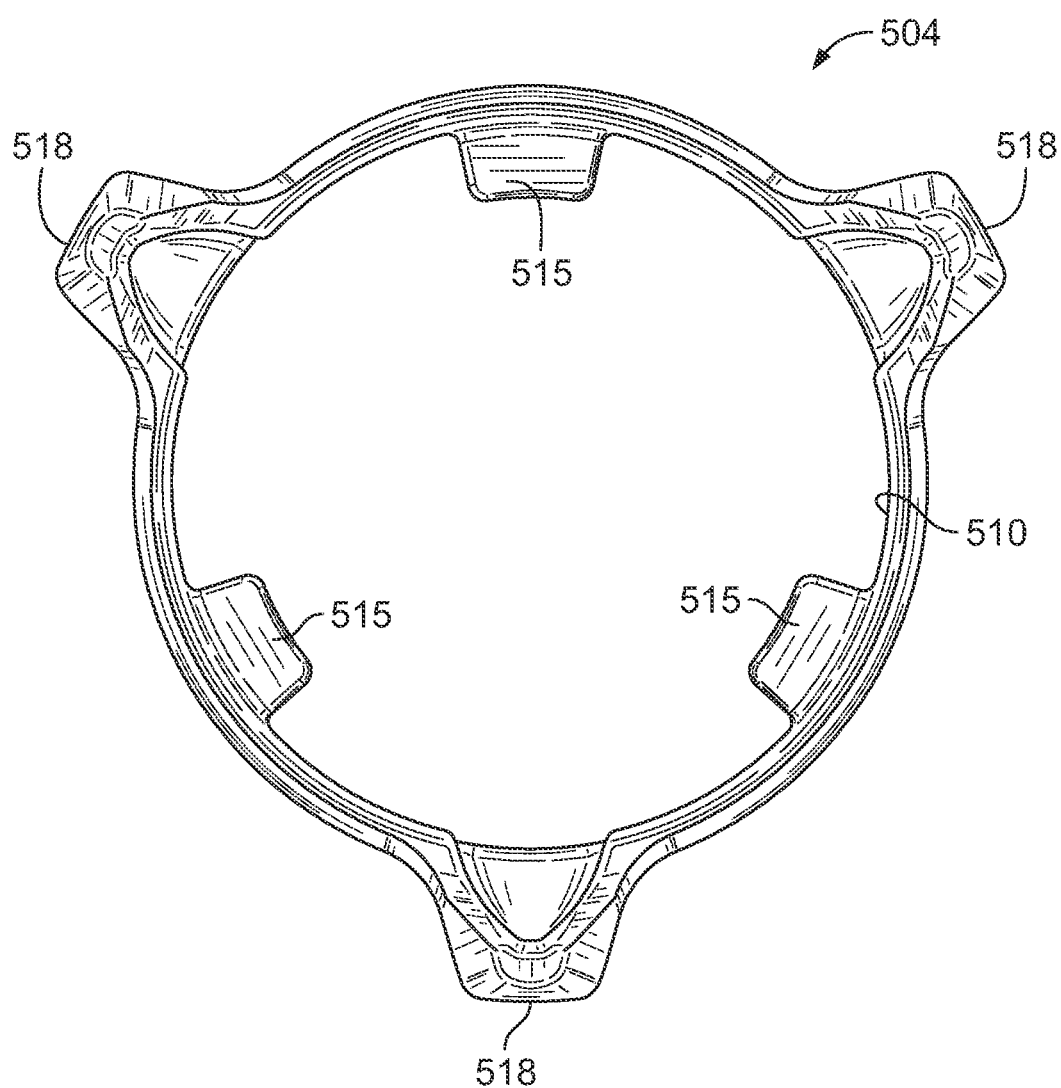
FIG. 30 is a bottom view of the mounting stand of FIG. 27.

Turning to FIGS. 26-30, another floral display assembly constructed in accordance with the teachings of the present invention is illustrated and generally identified at reference character 500. Again, the floral display assembly may be a cemetery vase 500 having a two-part construction including a vase proper 502 and mounting stand or base 504. The vase proper 502 and the mounting stand 504 may both be formed of injection molded plastic or any other suitable material. In FIGS. 26A and 26B, the vase proper 502 is shown removed from the base 504 for purposes of illustration. In FIGS. 27-30, the base 504 is shown removed from the vase proper 502.

The mounting stand 504 includes a top portion or connection portion 506 adapted to interface with cooperating features of the vase proper 502. As illustrated, the connection portion 506 has a generally cylindrical sidewall 508 defining a female opening 510 for receiving a corresponding male portion 512 proximate a bottom 514 of the vase proper 502. The female opening 510 defined by the connection portion 506 and the outer diameter of a corresponding male portion 512 of the vase proper 502 may both taper in a downward direction. As illustrated, the generally cylindrical sidewall 508 of the mounting stand 504 may be open at the top and the bottom.

One of the vase proper 502 and the mounting stand 504 includes at least one female element and the other of the vase proper 502 and the mounting stand 504 includes at least one male element for engaging the female portion. As will be appreciated more fully below, the vase proper 502 and the mounting stand 504 are first coupled in a linear direction and second in a rotational direction. In the embodiment illustrated, the vase proper 502 includes the at least one female element and the mounting stand 504 includes the at least one male element. In other applications, however, the vase proper 502 may include the at least one male element and the mounting stand 504 may include the at least one female element.

The mounting stand 504 may include at least one male element in the form of a plurality of detents 515 adapted to cooperatively engage at least one female element in the form of a corresponding plurality of openings 517 defined by the vase proper 502. The detents 515 and the openings 517 may be three in number. It will be appreciated, however, that the number of detents 515 and openings 517 may be greater or lesser than three within the scope of the present teachings.

The detents 515 may inwardly extend from the generally cylindrical sidewall 508 of the connection portion 506 into the opening 510. The detents 515 may be equally spaced about an inner perimeter of the connection portion and disposed in a common plane. Each detent 515 may have a circumferential length adjacent the generally cylindrical sidewall 508 that is greater than a width corresponding with a radial direction of the generally cylindrical sidewall.

The openings 517 of the vase proper 502 may be formed at the bottom 514 of the vase proper 502. As illustrated, the openings 517 are open to both the radial side of the male portion 512 at the bottom 514 and a closed bottom portion 521 of the vase proper 502. The openings 517 are shown to include a first portion 517A sized and arranged to receive the detents 515 in a vertical direction V. Upon assembly, the bottom 514 of the vase proper 502 is linearly inserted into the female opening 510 defined by the generally cylindrical flange 508. After the detents 515 pass through the first portions 517A of the openings 517, the vase proper 502 is rotated about its axis relative to the mounting stand 504 such that the smaller, second portions 517A of the openings 517 prevent detachment of the vase proper 502 from the mounting stand 504. In this manner the connection portion 506 and the vase proper 502 are connected in a threaded manner.

The mounting stand 504 may include a lower portion 519 defined by a plurality of downwardly extending legs or spikes 518. In the embodiment illustrated, the lower portion 519 is defined by three spikes 518. The lower portion 519 may alternatively include a greater or lesser number of spikes 518 within the scope of the present teachings. Upper ends of the spikes 518 may radially extend from the generally cylindrical sidewall 508 of the connection portion 506.

The vase proper 502 may be closed at a lower side by the bottom portion 521. The bottom portion defines a circular disk 521 that may be formed to include a plurality of holes 522 axially extending therethrough for the drainage of water.

The interior of the vase proper 502 may be formed with a plurality of inwardly extending ribs 524. The ribs 524 may be used to engage a foam insert for receiving flower stems or the like and may function to prevent rotation of foam insert within the interior of the vase proper 502.

As discussed above with regard to earlier embodiments, the floral display assembly 100 may be oriented in 100 is in a first orientation or use orientation and oriented in a second orientation or shipping orientation. The first orientation is shown in FIG. 26. In the second orientation, the vase proper 502 is nested within the spikes 518 of the mounting stand 504 to effectively reduce an axial length of the vase 500.

Accordingly, the present teachings provide various two-part construction embodiments of floral display assemblies. Among other advantages, the various designs are designed to withstand wind (e.g., allowing wind to blow through the spikes), accommodate a wide variety of arrangements, readily drain rainwater, are easier to ship, and are quick and easy to install. As discussed above, the floral display assemblies of the present teachings may be embodied as cemetery vases. It will be understood, however, that the present teachings are not so limited and may be used within the scope of the present teachings for various types of floral display assemblies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A two-part floral display assembly comprising:
a vase proper including a generally cylindrical sidewall and a lower disk-shaped portion; and
a mounting stand coupled to the vase proper, the mounting stand including a generally cylindrical flange sized and configured to receive a lower portion of the generally cylindrical sidewall of the vase proper, the generally cylindrical flange open at a top and a bottom thereof,
wherein the mounting stand includes a plurality of detents extending radially inward from the generally cylindrical flange,
wherein the vase proper includes a plurality of openings arranged and configured to receive the plurality of detents and cooperate with the plurality of detents to couple the vase proper and the mounting stand, and
wherein each opening of the plurality of openings includes a first portion having a first radial dimension and a second portion having a second radial dimension, the first radial dimension being greater than the second radial dimension.

2. The two-part floral display assembly of claim 1, wherein the vase proper and the mounting stand are both constructed of an injection molded plastic.

3. The two-part floral display assembly of claim 1, wherein the vase proper and the mounting stand are sized and configured to be assembly first in an axial direction and second in a rotational direction.

4. The two-part floral display assembly of claim 1, wherein the mounting stand includes an upper generally cylindrical portion and the vase proper includes a lower portion axially receiving the upper generally cylindrical portion.

5. The two-part floral display assembly of claim 1, wherein a lower end of the vase proper is closed by the lower disk-shaped portion.

6. The two-part floral display assembly of claim 1, wherein the lower disk-shaped portion includes a plurality of holes axially extending therethrough for water drainage.

7. The two-part floral display assembly of claim 1, wherein the vase is configurable to a first, use orientation and a second, shipping orientation, such that in the second orientation, the vase proper is nested within spikes of the mounting stand to effectively reduce an axial length of the vase.

8. A method of assembling the two-part floral display assembly of claim 1, the method comprising configuring the vase in a first orientation by inserting a lower end of the vase proper into an upper generally cylindrical portion of the mounting stand and rotating the vase proper relative to the mounting stand.

9. The method of assembling the two-part floral display assembly of claim 8, the method further comprising configuring the vase in a second, shipping orientation by nesting the vase proper at least partially within axially extending spikes of the mounting stand to effectively reduce a length of the vase.

10. A two-part floral display assembly comprising:
a vase proper including a sidewall and a lower disk-shaped portion; and
a mounting stand coupled to the vase proper, the mounting stand including a flange sized and configured to receive a lower portion of the sidewall of the vase proper,
wherein the mounting stand includes a plurality of detents extending radially inward from the flange,
wherein the vase proper includes a plurality of openings arranged and configured to receive the plurality of detents and cooperate with the plurality of detents to couple the vase proper and the mounting stand, and
wherein each opening of the plurality of openings includes a first portion having a first radial dimension and a second portion having a second radial dimension, the first radial dimension being greater than the second radial dimension.

11. The two-part floral display assembly of claim 10, wherein the vase proper and the mounting stand are both constructed of an injection molded plastic.

12. The two-part floral display assembly of claim 10, wherein the vase proper and the mounting stand are sized and configured to be assembly first in an axial direction and second in a rotational direction.

13. The two-part floral display assembly of claim 10, wherein the mounting stand includes an upper generally cylindrical portion and the vase proper includes a lower portion axially receiving the upper generally cylindrical portion.

14. The two-part floral display assembly of claim 10, wherein a lower end of the vase proper is closed by the lower disk-shaped portion.

15. The two-part floral display assembly of claim 10, wherein the lower disk-shaped portion includes a plurality of holes axially extending therethrough for water drainage.

16. The two-part floral display assembly of claim 10, wherein the vase is configurable to a first, use orientation and a second, shipping orientation, such that in the second orientation, the vase proper is nested within spikes of the mounting stand to effectively reduce an axial length of the vase.

17. A method of assembling the two-part floral display assembly of claim 10, the method comprising configuring the vase in a first orientation by inserting a lower end of the vase proper into an upper generally cylindrical portion of the mounting stand and rotating the vase proper relative to the mounting stand.

18. The method of assembling the two-part floral display assembly of claim 17, the method further comprising configuring the vase in a second, shipping orientation by nesting the vase proper at least partially within axially extending spikes of the mounting stand to effectively reduce a length of the vase.

* * * * *